(12) United States Patent
Topliss

(10) Patent No.: US 9,917,991 B2
(45) Date of Patent: Mar. 13, 2018

(54) CAMERA ACTUATOR

(71) Applicant: Apple Inc., Cupertino, CA (US)

(72) Inventor: Richard J. Topliss, Campbell, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 14/723,422

(22) Filed: May 27, 2015

(65) Prior Publication Data
US 2016/0119517 A1 Apr. 28, 2016

Related U.S. Application Data

(60) Provisional application No. 62/068,459, filed on Oct. 24, 2014.

(51) Int. Cl.
*H04N 5/225* (2006.01)
*G03B 13/36* (2006.01)

(52) U.S. Cl.
CPC .......... *H04N 5/2253* (2013.01); *G03B 13/36* (2013.01); *H04N 5/2254* (2013.01); *H04N 5/2257* (2013.01); *H04N 5/2259* (2013.01)

(58) Field of Classification Search
CPC .. H04N 5/2253; H04N 5/2254; H04N 5/2257; H04N 5/2259
See application file for complete search history.

(56) References Cited

U.S. PATENT DOCUMENTS

| 7,489,340 | B2 | 2/2009 | Koo et al. | |
|---|---|---|---|---|
| 7,772,532 | B2 * | 8/2010 | Olsen | G02B 7/04 250/208.1 |
| 8,138,564 | B2 | 3/2012 | Kosaka et al. | |
| 8,605,160 | B2 | 12/2013 | Kwon et al. | |
| 9,310,583 | B2 * | 4/2016 | Kim | G02B 26/0875 |
| 2002/0195546 | A1 * | 12/2002 | Yamaguchi | G02B 7/022 250/214.1 |

(Continued)

FOREIGN PATENT DOCUMENTS

WO 2013049688 4/2013

OTHER PUBLICATIONS

International Search Report and Written Opinion from PCT/US2015/055837, dated Jan. 11, 2016, Apple Inc., pp. 1-12.

*Primary Examiner* — Daniel M Pasiewicz
(74) *Attorney, Agent, or Firm* — Robert C. Kowert; Meyertons, Hood, Kivlin, Kowert & Goetzel, P.C.

(57) ABSTRACT

Some embodiments include an actuator assembly for mounting a moving component. In some embodiments, the actuator assembly includes a base substrate including a first portion for mounting comb drive actuators and a second portion for mounting the moving component. In some embodiments, the actuator assembly includes a plurality of comb drive actuators rigidly affixed to the first portion of the base substrate. In some embodiments, the plurality of comb drive actuators is flexibly affixed to the second portion of the base substrate by a plurality of respective mechanical flexures. In some embodiments, the respective mechanical flexures provide a flexible mechanical connection between the second portion and the first portion, and the plurality of comb drive actuators is arranged to control the motion of the second portion to adjust the position of the moving component in multiple degrees of freedom relative to first portion.

20 Claims, 38 Drawing Sheets

(56) References Cited

U.S. PATENT DOCUMENTS

| | | | |
|---|---|---|---|
| 2005/0041134 A1* | 2/2005 | Takayama | G02B 3/0075 |
| | | | 348/340 |
| 2006/0092514 A1 | 5/2006 | Koo et al. | |
| 2007/0002159 A1 | 1/2007 | Olsen et al. | |
| 2008/0273092 A1 | 11/2008 | Chiou et al. | |
| 2015/0321900 A1* | 11/2015 | Liu | B81B 3/0051 |
| | | | 74/469 |
| 2015/0341534 A1* | 11/2015 | Ng | H04N 5/2254 |
| | | | 348/208.7 |
| 2015/0350499 A1* | 12/2015 | Topliss | H04N 5/2253 |
| | | | 348/373 |
| 2016/0165103 A1* | 6/2016 | Topliss | H04N 5/2253 |
| | | | 348/373 |
| 2016/0227117 A1* | 8/2016 | Gutierrez | G03B 3/10 |

\* cited by examiner

*Stacked Actuator Pair 900*

CAMERA ACTUATOR

CLAIM OF PRIORITY

This application claims benefit of priority of U.S. Provisional Application Ser. No. 62/068,459 entitled "CAMERA ACTUATOR" filed Oct. 24, 2014, the content of which is incorporated by reference herein in its entirety and for all purposes.

BACKGROUND

Technical Field

This disclosure relates generally to control of the motion of camera components.

Description of the Related Art

For high-end computing devices, it is common to incorporate miniature cameras. One typical feature augmentation for such miniature cameras is autofocus (AF). The incumbent actuator technology for such cameras is the voice coil motor (VCM). Many other technologies have been proposed, with varying strengths and weaknesses and differing degrees of commercial success. The voice coil motor technology has the key advantage of being simple, and therefore being straightforward to design.

While there are several disadvantages of voice coil motor, such as high power, and low relative force, their use persists in spite of the associated costs.

Demands on improvements to performance of such miniature cameras are constant, as are demands for continued miniaturization, given the added features and devices added to such mobile devices.

In particular, demands to decrease the dimensions of camera components and demands for high image quality continue to create an ongoing desire for camera components that exhibit superior performance as measured in various ways, while consuming less space and energy.

SUMMARY OF EMBODIMENTS

Some embodiments include an actuator assembly for mounting a moving component. In some embodiments, the actuator assembly includes a base substrate including a first portion for mounting comb drive actuators and a second portion for mounting the moving component. In some embodiments, the actuator assembly includes a plurality of comb drive actuators rigidly affixed to the first portion of the base substrate. In some embodiments, the plurality of comb drive actuators is flexibly affixed to the second portion of the base substrate by a plurality of respective mechanical flexures. In some embodiments, the respective mechanical flexures provide a flexible mechanical connection between the second portion and the first portion, and the plurality of comb drive actuators is arranged to control the motion of the second portion to adjust the position of the moving component in multiple degrees of freedom relative to first portion.

Figure 1:
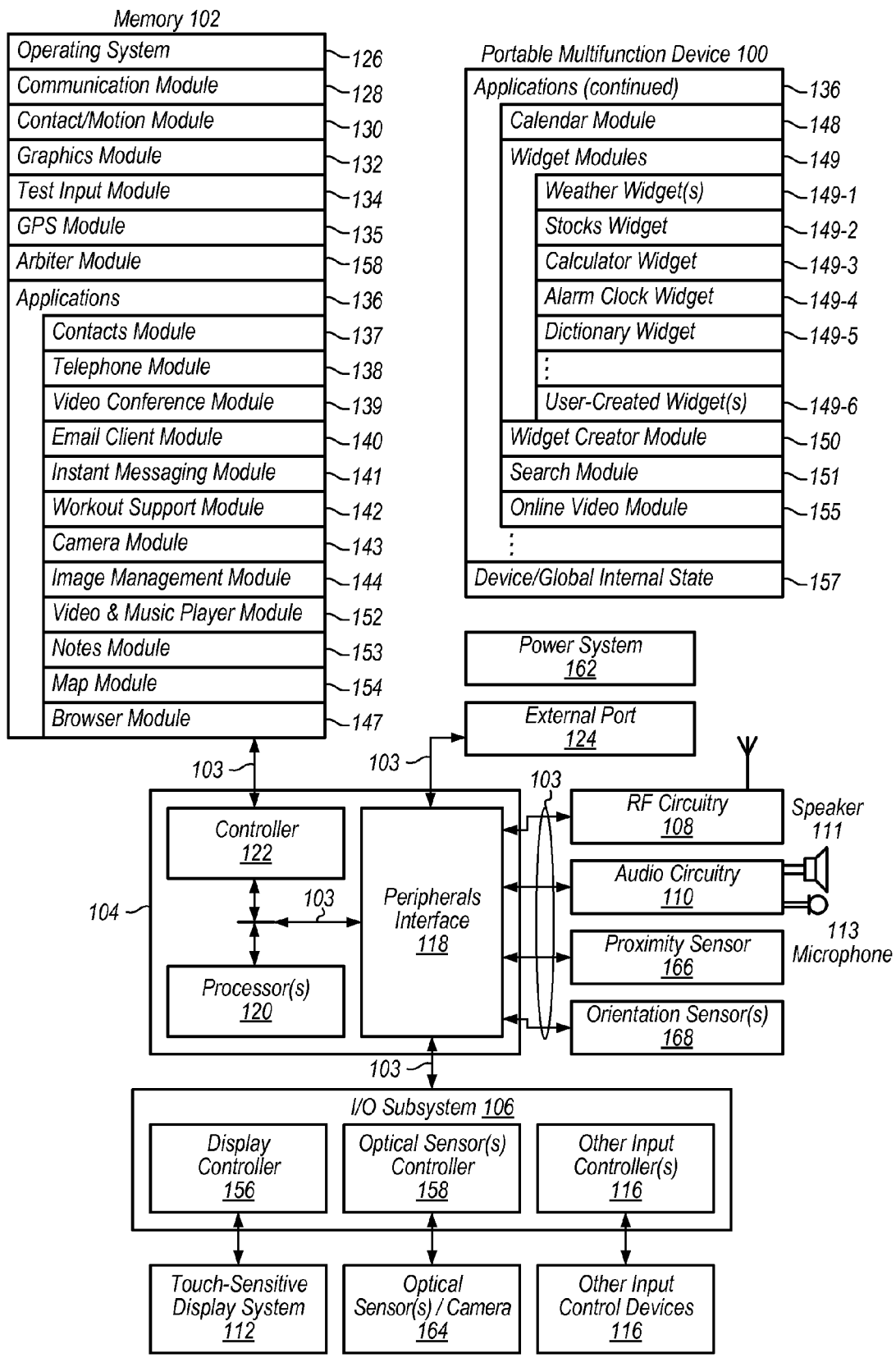
FIG. 1 illustrates a block diagram of a portable multifunction device with a camera in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide a camera actuator architecture that moves an image sensor relative to a support structure, where the camera lens is rigidly connected to the support structure. In some embodiments, the image sensor is flip-chip bonded to a ceramic substrate. In some embodiments, the actuator includes one or more electrostatic comb-drive actuators. In some embodiments, the one or more comb-drive actuators are built up layer-by-layer on a ceramic substrate that has a moving portion to which the image sensor is bonded and a fixed portion to which the support structure and lens are bonded. In some embodiments, the comb drive actuators are fabricated layer-by-layer using a metal MEMS process. In some embodiments, there are eight comb-drives configured to control the position of the image sensor in six degrees of freedom.

In some embodiments, the moving and fixed portion of each comb-drive are fabricated on the fixed portion of the ceramic substrate, and the ceramic substrate includes embedded conductive tracks to route electrical connections to the moving and fixed portions of each comb-drive. In some embodiments, the metal MEMS process is also used to route electrical connections from the moving image sensor to the fixed portion of the ceramic substrate. In some embodiments each comb drive has a linkage between it and the moving portion of the ceramic substrate that is relatively stiff in the direction associated with the force from the comb-drive, but is relatively compliant in orthogonal directions to accommodate the motions of the other comb drives on the image sensor.

Some embodiments include a portable multifunction computing device. In some embodiments, the portable multifunction computing device includes a camera. In some embodiments, the camera includes a base substrate including a first portion and a second portion, a lens rigidly coupled to the first portion of the base substrate, and an image sensor rigidly coupled to the second portion of the base substrate, and a plurality of comb drive actuators rigidly affixed to the first portion of the base substrate. In some embodiments, the plurality of comb drive actuators is flexibly affixed to the second portion of the base substrate by a plurality of respective mechanical flexures. In some embodiments, the respective mechanical flexures provide a flexible mechanical connection between the second portion and the first portion. In some embodiments, the plurality of comb drive actuators is arranged to control the motion of the second portion to adjust the position of the image sensor in multiple degrees of freedom relative to a lens of the camera module.

In some embodiments, each of the plurality of comb drive actuators includes at least two independent comb drive array portions. Some embodiments are configured to move the image sensor instead of the lens to achieve the required actuation functions in the camera. Moving the image sensor in linear directions orthogonal to the optical axis represents two degrees of freedom of motion (which can be labeled the X and Y directions). These linear motions compensate for angular tilting changes in the camera position from the user handshake (typically called 'pitch' and 'yaw' tilts).

Although in practice a little less important, it is also valuable to rotate the image sensor about the optical axis to compensate for 'roll' tilts from the user's handshake. Compensating this degree of freedom becomes more valuable for more wide-angle lenses, as the corners of the image away from the optical axis are more prone to roll blur. In addition, as may be appreciated, the autofocus function benefits from relative movement between one of more lens elements and the image sensor along the optical axis. For some embodiments, one of skill in the art will appreciate in light of having read the present disclosure that this is achieved by moving the image sensor along the optical axis.

Finally, one of the main sources of image degradation in miniature cameras is relative tilt between the image sensor and the lens, such that not all of the image sensor can be positioned at the image plane of the lens at the same time. This leads to blurring of the images at the sides and corners. This is typically combated during camera manufacture to minimize all the tolerances in the stack that determines side lens tilt. However typical lens tilt specifications are around 3 to 6 arc minutes, which corresponds to tolerances of 7 to 15 um across the surface of the image sensor. This tolerance being split between the lens, actuator and image sensor substrate tolerances, and then the final integration processes, where the lens assembly is bonded to the image sensor assembly. Some embodiments address this issue by incorporating these two extra tilt degrees of freedom to the actuator package.

This means that some embodiments include an actuator package that can move the image sensor relative to the lens in all six degrees of freedom: along three orthogonal linear axes, and three rotations about the same axes. The MEMS (Microelectromechanical systems) technology of the comb actuator components of some embodiments enables a compact actuator package to deliver such movement flexibility. Moreover, the MEMS technology is relatively easy to integrate with the Silicon image sensor. In some embodiments, it is possible to integrate the actuator onto the same ceramic substrate material as the image sensor, which may then be integrated in one of several ways to mechanically mount and electrically route the electrical connections to other devices and in the camera, and to the wider system outside the camera.

Some embodiments include a portable multifunction computing device. In some embodiments, the portable multifunction computing device includes a camera. In some embodiments, the camera includes a base substrate including a first portion and a second portion, a lens rigidly coupled to the first portion of the base substrate, and an image sensor rigidly coupled to the second portion of the base substrate, and a plurality of comb drive actuators rigidly affixed to the first portion of the base substrate. In some embodiments, the plurality of comb drive actuators is flexibly affixed to the second portion of the base substrate by a plurality of respective mechanical flexures. In some embodiments, the respective mechanical flexures provide a flexible mechanical connection between the second portion and the first portion. In some embodiments, the plurality of comb drive actuators is arranged to control the motion of the second portion to adjust the position of the image sensor in multiple degrees of freedom relative to a lens of the camera module.

In some embodiments, the portable multifunction computing further includes a plurality of electrically conductive flexures, separate from the plurality of respective mechanical flexures. In some embodiments, the electrically conductive flexures provide an electrical current conductive path between the image sensor and conductors mounted on the first portion.

In some embodiments, the comb drive actuators operate in parallel, rather than in series. In some embodiments, each of the comb drive actuators generates bi-directional motion with a center of travel in a neutral position. In some embodiments, the conductors mounted on the first portion include flip-chip bonding pads. In some embodiments, the first portion includes a ceramic substrate material. In some embodiments, the second portion is a ceramic substrate material.

Some embodiments include an actuator assembly for mounting a moving component. In some embodiments, the actuator assembly includes a base substrate including a first portion for mounting comb drive actuators and a second portion for mounting the moving component. In some embodiments, the actuator assembly includes a plurality of comb drive actuators rigidly affixed to the first portion of the base substrate. In some embodiments, the plurality of comb drive actuators is flexibly affixed to the second portion of the base substrate by a plurality of respective mechanical flexures. In some embodiments, the respective mechanical flexures provide a flexible mechanical connection between the second portion and the first portion, and the plurality of comb drive actuators is arranged to control the motion of the second portion to adjust the position of the moving component in multiple degrees of freedom relative to first portion.

In some embodiments, actuator assembly for mounting a moving component further includes a plurality of electrically conductive flexures, separate from the plurality of respective mechanical flexures. In some embodiments, the electrically conductive flexures provide an electrical current conductive path between the moving component and conductors mounted on the first portion. In some embodiments, the comb drive actuators operate in parallel, rather than in series.

In some embodiments, each of the comb drive actuators generates bi-directional motion with a center of travel in a neutral position. In some embodiments, the conductors mounted on the first portion include flip-chip bonding pads. In some embodiments, the first portion includes a ceramic substrate material. In some embodiments, the second portion includes a ceramic substrate material.

Some embodiments include a camera module for a portable multifunction device. In some embodiments, the camera module includes a base substrate including a first portion and a second portion, a lens rigidly coupled to the first portion of the base substrate, an image sensor rigidly coupled to the second portion of the base substrate, and a plurality of comb drive actuators rigidly affixed to the first portion of the base substrate. In some embodiments, the plurality of comb drive actuators is flexibly affixed to the second portion of the base substrate by a plurality of respective mechanical flexures, the respective mechanical flexures provide a flexible mechanical connection between the second portion and the first portion, and the plurality of comb drive actuators is arranged to control the motion of the second portion to adjust the position of the image sensor in multiple degrees of freedom relative to a lens of the camera module.

Some embodiments further include a plurality of electrically conductive flexures, separate from the plurality of respective mechanical flexures. In some embodiments, the electrically conductive flexures provide an electrical current conductive path between the image sensor and conductors mounted on the first portion. In some embodiments, the comb drive actuators operate in parallel, rather than in series. In some embodiments, each of the comb drive actuators generates bi-directional motion with a center of travel in a neutral position. In some embodiments, the conductors mounted on the first portion include flip-chip bonding pads. In some embodiments, the first portion includes a ceramic substrate material.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 1A is a block diagram illustrating portable multifunction device 100 with camera 164 in accordance with some embodiments. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
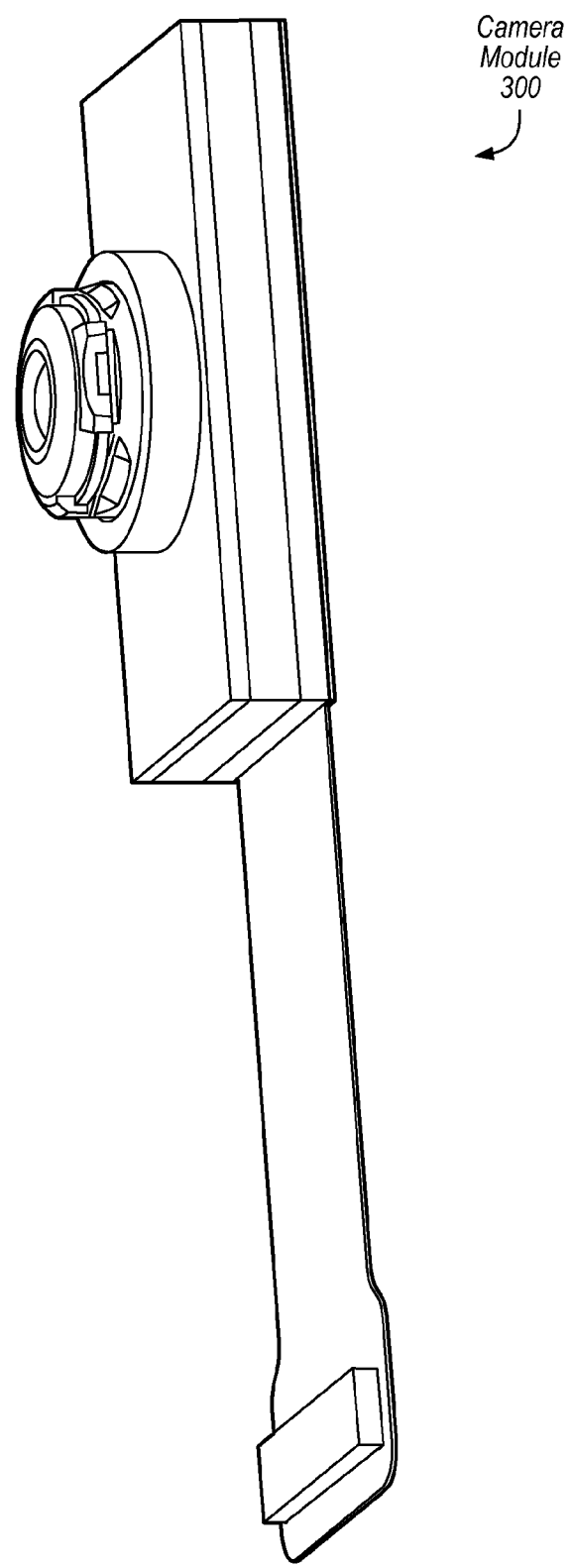
FIG. 3 illustrates a camera module with a MEMS actuator for use with an image sensor according to some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
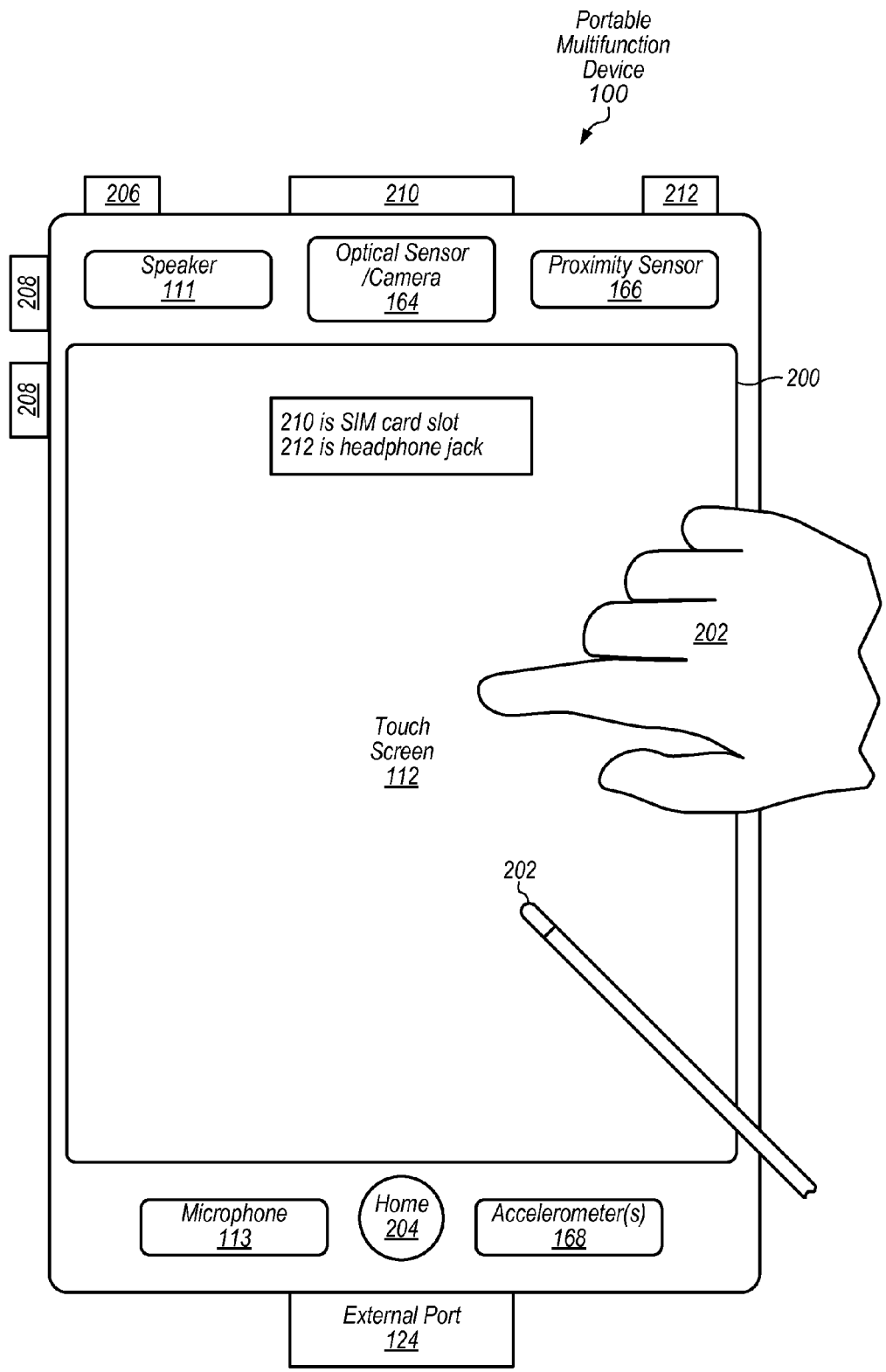
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to optical sensor/camera 164 (on the front of a device), rear-facing camera or optical sensor that is pointed opposite from the display may be used instead of optical sensor/camera 164.

Camera Module of a Multifunction Device with MEMS Actuators

FIG. 3 illustrates a camera module with a MEMS actuator for use with an image sensor according to some embodiments. A camera module 300 includes three-axis optical image stabilization (X, Y and roll) of an image sensor relative to a fixed lens. Camera module 300 additionally provides autofocus (Z) movement of the image sensor relative to the fixed lens. Some embodiments provide low shoulder height (Z or optical axis) and low power consumption. Some embodiments provide movement of the image sensor relative to the fixed lens without the use of magnets. In some embodiments, the fixed lens reduce lens clearance requirements and enables replaceable lenses, such that the camera may be field-customized with, for example, removeable lenses. Some embodiments use a metal MEMS process that can be built on ceramic substrates, thereby increasing feature flexibility range, enabling end-stop incorporation, and providing for the use of flexure springs with greater ductility.

In some embodiments, a MEMs fabrication process uses masks and photolithography to expose photoresist. A structural metal is plated. Photoresist is removed. A sacrificial metal is plated. Planarization is performed (surfaces are ground and lapped to prepare for a next layer). These steps are repeated until, at the end, sacrificial metal is etched away to release the metal structure. Such a process enables undercuts, thereby increasing the range of available features.

Figure 4:
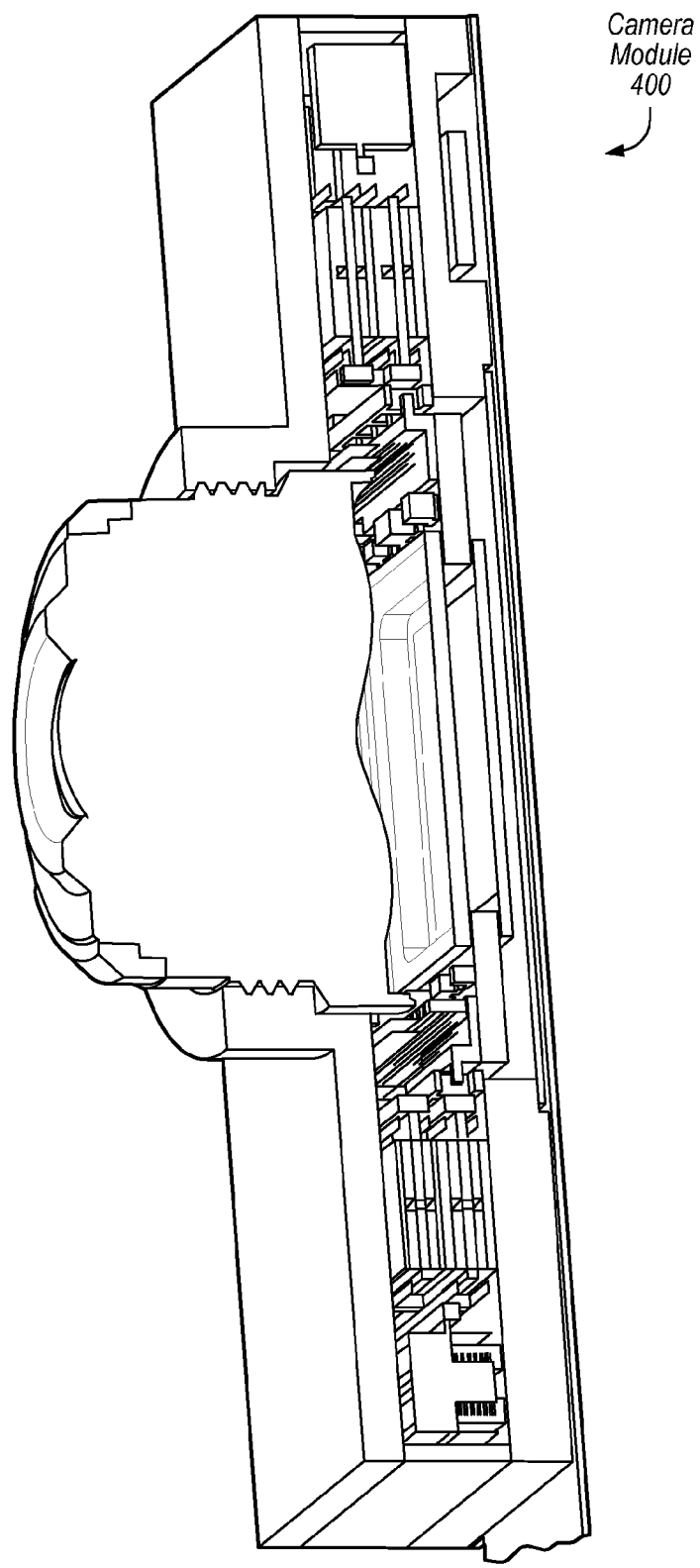
FIG. 4 depicts a cutaway view of a camera module assembly with a MEMS actuator for use with an image sensor according to some embodiments.

FIG. 4 depicts a cutaway view of a camera module with a MEMS actuator for use with an image sensor according to some embodiments. A camera module 400 includes three-axis optical image stabilization (X, Y and roll) of an image sensor relative to a fixed lens. Camera module 400 additionally provides autofocus (Z) movement of the image sensor relative to the fixed lens. Some embodiments provide low shoulder height (Z or optical axis) and low power consumption. Some embodiments provide movement of the image sensor relative to the fixed lens without the use of magnets. In some embodiments, the fixed lens reduce lens clearance requirements and enables replaceable lenses, such that the camera may be field-customized with, for example, removeable lenses. Some embodiments use a metal MEMS process that can be built on ceramic substrates, thereby increasing feature flexibility range, enabling end-stop incorporation, and providing for the use of flexure springs with greater ductility.

In some embodiments, a MEMs fabrication process uses masks and photolithography to expose photoresist. A structural metal is plated. Photoresist is removed. A sacrificial metal is plated. Planarization is performed (surfaces are ground and lapped to prepare for a next layer). These steps are repeated until, at the end, sacrificial metal is etched away to release the metal structure. Such a process enables undercuts, thereby increasing the range of available features.

Figure 5:
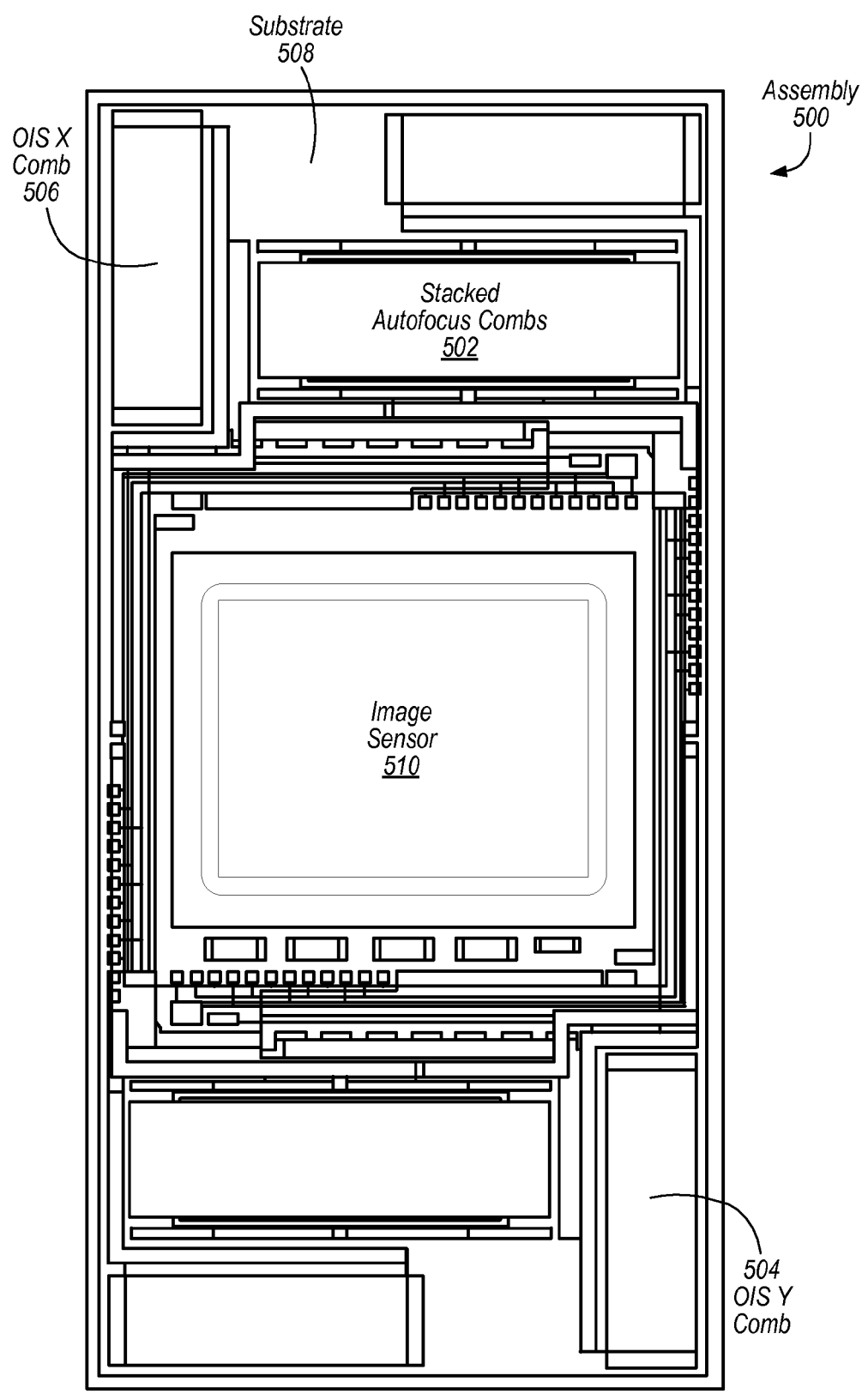
FIG. 5 illustrates a plan view of a camera module assembly with a MEMS actuator for use with an image sensor according to some embodiments.

FIG. 5 illustrates a plan view of a camera module assembly with a MEMS actuator for use with an image sensor according to some embodiments. Assembly 500 includes stacked autofocus combs 502, OIS Y combs 504, OIS X combs 506, and an image sensor 510 mounted, all mounted on a substrate 508. In some embodiments, Assembly 500 includes eight independent bi-directional electrostatic comb drives. Four 'autofocus combs' each move one corner of the image sensor in the Z direction. Four 'optical image stabilization combs' are each linked to a corner of the image sensor, including two for moving the sensor in the X direction and two for moving the sensor in the Y direction. Twenty-four L-shaped passive spring flexures make electrical contact between the moving ceramic substrate and the fixed substrate. Decoupling passives are mounted on the moving substrate to minimize the number of connections between the moving and fixed substrates. Flexure linkages link each comb to the image sensor substrate. Linkages have different stiffnesses in the different directions to both transfer loads from the comb, and accommodate the motions of the other combs. MEMS end-stop structures limit the motion of the moving substrate in each direction.

Figure 6:
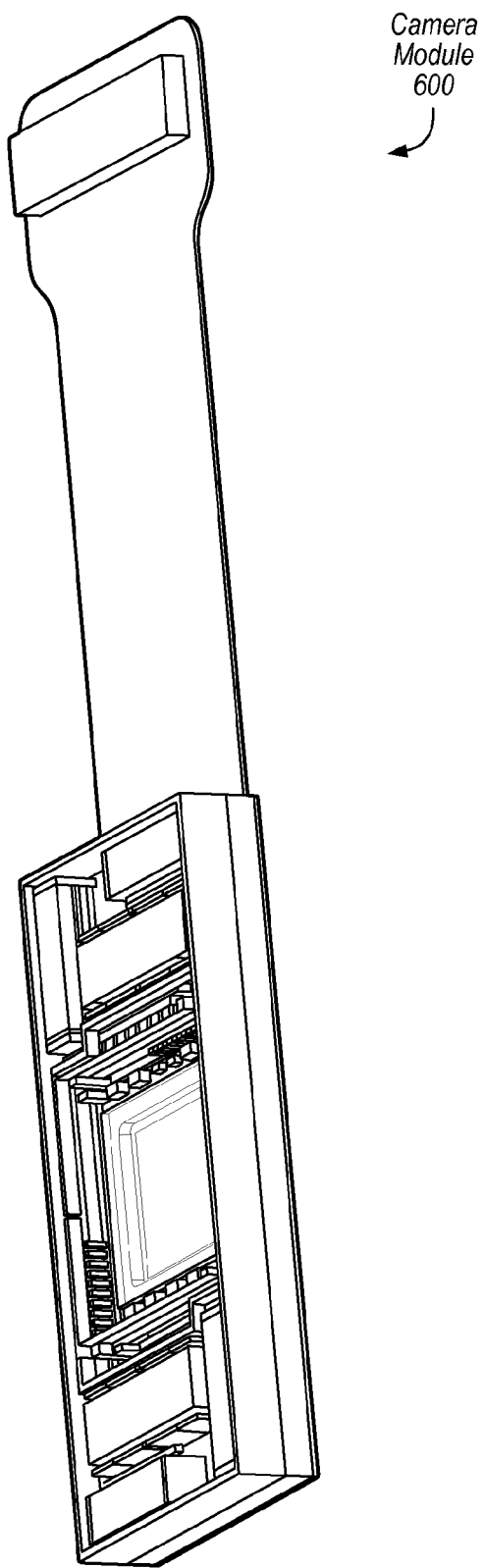
FIG. 6 depicts an angled view of a camera module with a MEMS actuator for use with an image sensor according to some embodiments.

FIG. 6 depicts an angled view of a camera module assembly with a MEMS actuator for use with an image sensor according to some embodiments. Assembly 600 includes stacked autofocus combs 602, OIS Y combs 604, OIS X combs 606, and an image sensor 610 mounted, all mounted on a substrate 608. In some embodiments, Assembly 600 includes eight independent bi-directional electrostatic comb drives. Four 'autofocus combs' each move one corner of the image sensor in the Z direction. Four 'optical image stabilization combs' are each linked to a corner of the image sensor, including two for moving the sensor in the X direction and two for moving the sensor in the Y direction. Twenty-four L-shaped passive spring flexures make electrical contact between the moving ceramic substrate and the fixed substrate. Decoupling passives are mounted on the moving substrate to minimize the number of connections between the moving and fixed substrates. Flexure linkages link each comb to the image sensor substrate. Linkages have different stiffnesses in the different directions to both transfer loads from the comb, and accommodate the motions of the other combs. MEMS end-stop structures limit the motion of the moving substrate in each direction.

MEMS Actuators

Figure 7:
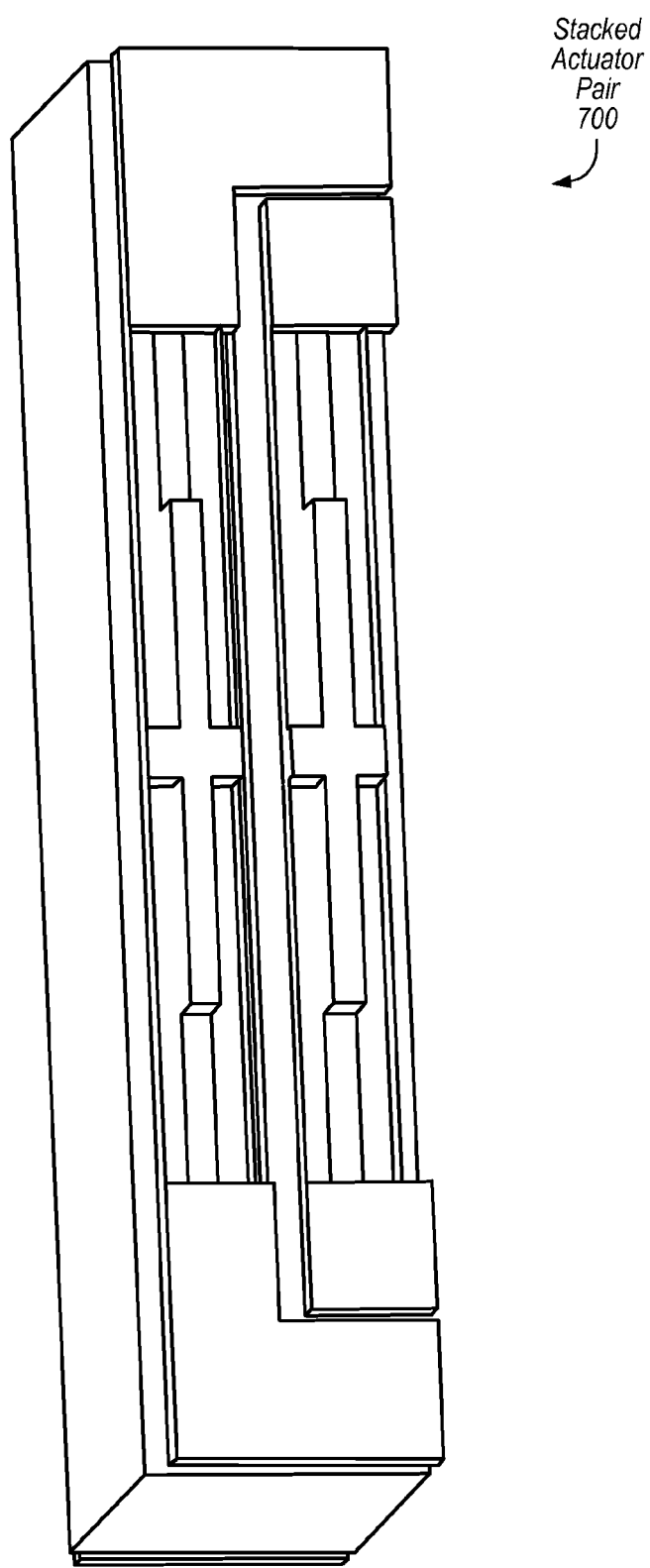
FIG. 7 illustrates a stacked pair of MEMS actuators for use with an image sensor according to some embodiments.

FIG. 7 illustrates a stacked pair of MEMS actuators for use with an image sensor according to some embodiments. FIG. 7 highlights the general structures of the MEMS device labeled stacked actuator pair 700. In the embodiment shown in FIG. 7, first order calculation estimates indicate ~0.7 mN electrostatic force is generated when 60V is applied to a comb. In the embodiment shown in FIG. 7, the suspension flexures have a stiffness of ~6 mN/mm. In the embodiment shown in FIG. 7, from simulation, 0.8 mN generates ~115 um Z displacement of one corner of the image sensor substrate. In the embodiment shown in FIG. 7, each comb is bi-directional, hence energizing the other half of the comb with −60V generates roughly −115 um. In the embodiment shown in FIG. 7, when in the central neutral position, there is no overlap between the moving and fixed combs to avoid having to fabricate a 5 um gap. In the embodiment shown in FIG. 7, the capacitance will thus be highly non linear with displacement, although it may be characterized and may be used as a position feedback parameter. In the embodiment shown in FIG. 7, to first order, the comb capacitance is '0 pF' at the center of travel, rising to 43 pF at 100 um travel in either direction.

Figure 8:
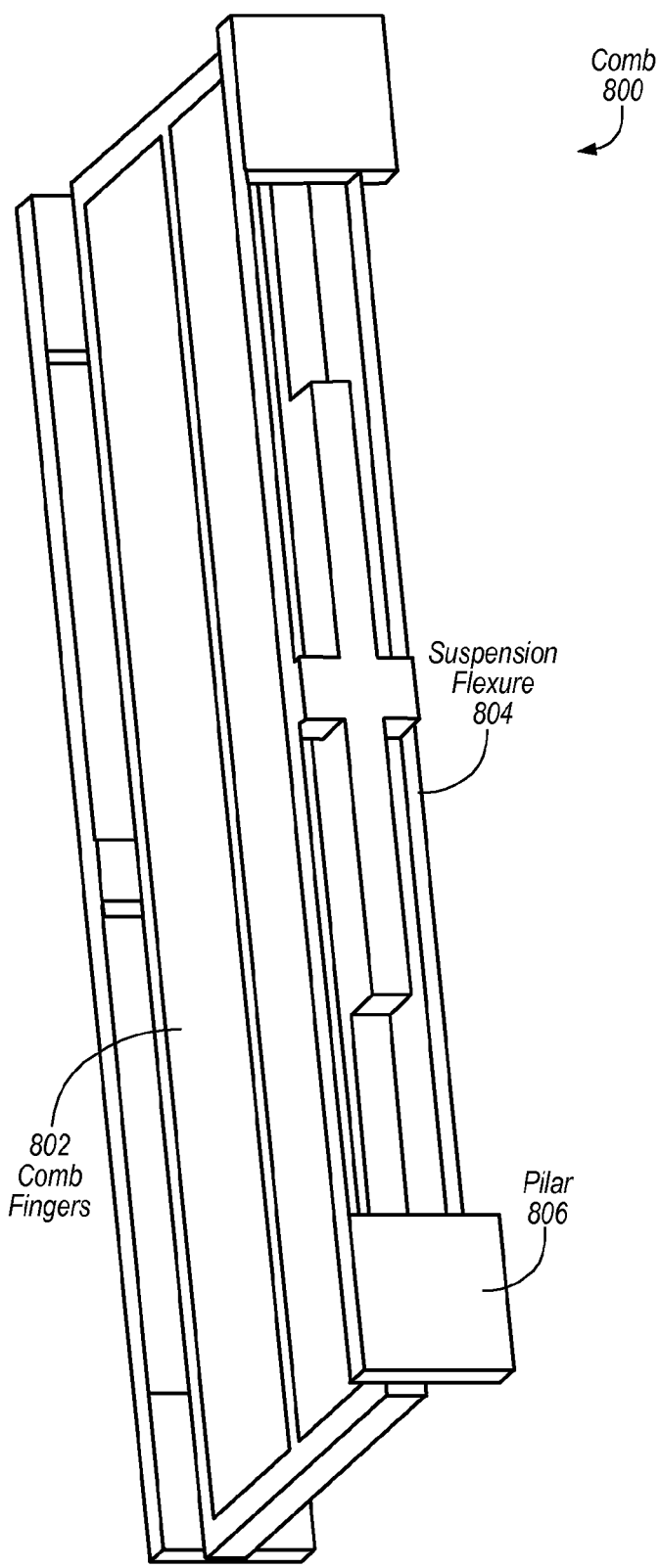
FIG. 8 depicts a MEMS actuator for use in a stacked pair of MEMS actuators for use with an image sensor according to some embodiments.

FIG. 8 depicts a MEMS actuator for use in a stacked pair of MEMS actuators for use with an image sensor according to some embodiments. Comb 800 has fingers 802, a suspension flexure 804, and a pillar 806 for connection to a substrate. In the embodiment shown in FIG. 8, each AF comb has 172 fingers. In the embodiment shown in FIG. 8, first order calculation estimates indicate ~0.8 mN electrostatic force is generated when 60V is applied to the comb. In the embodiment shown in FIG. 8, the suspension flexures have a stiffness of ~6 mN/mm. In the embodiment shown in FIG. 8, from simulation, 0.8 mN generates ~115 um Z displacement of one corner of the image sensor substrate. In the embodiment shown in FIG. 8, each comb is bi-directional, hence energizing the other half of the comb with −60V generates roughly −115 um. In the embodiment shown in FIG. 8, when in the central neutral position, there is no overlap between the moving and fixed combs to avoid having to fabricate a 5 um gap. In the embodiment shown in FIG. 8, the capacitance will thus be highly non linear with displacement, although it may be characterized and may be used as a position feedback parameter. In the embodiment shown in FIG. 8, to first order, the comb capacitance is '0 pF' at the center of travel, rising to 43 pF at 100 um travel in either direction.

Figure 9:
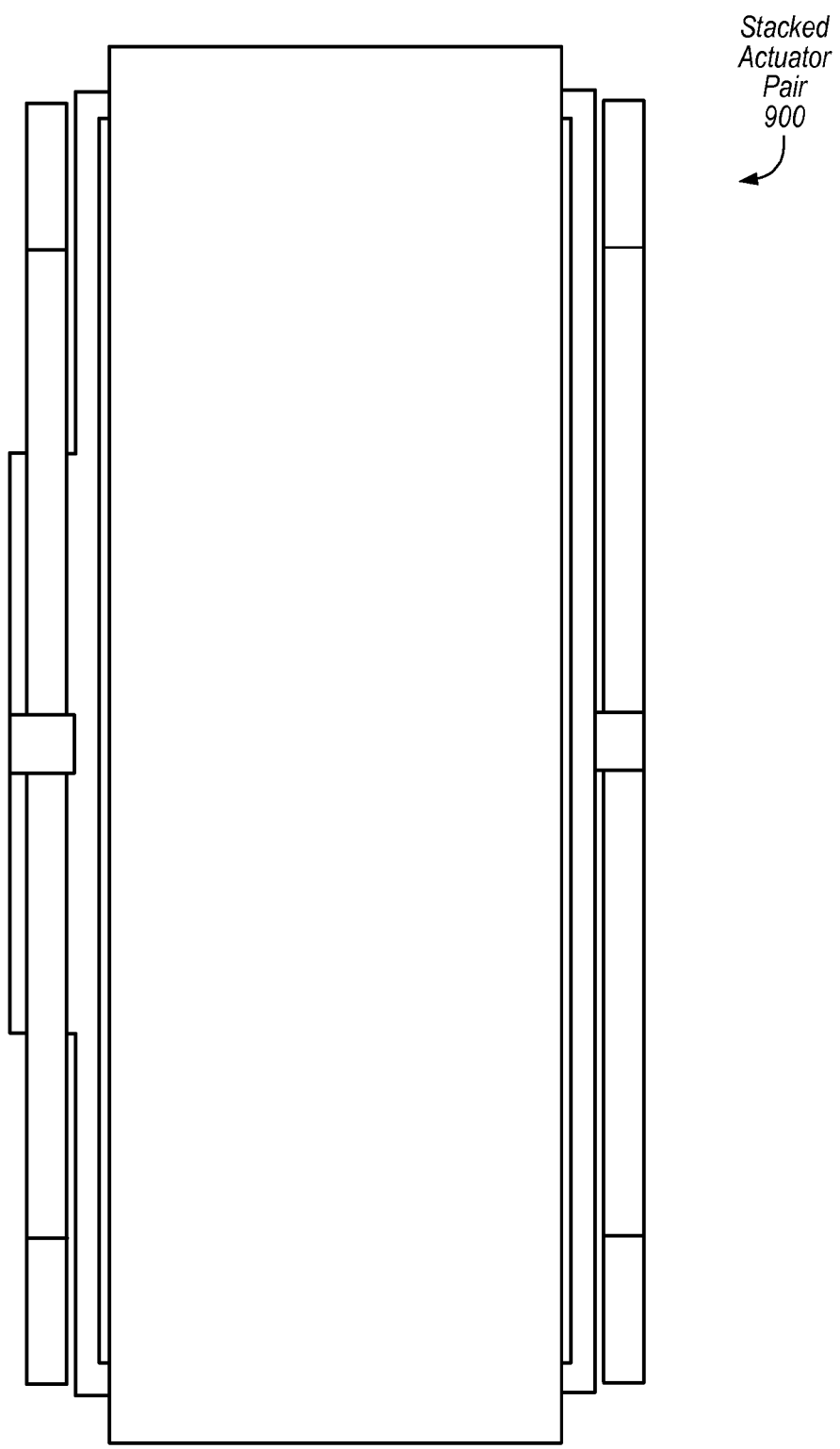
FIG. 9 illustrates a plan view of a stacked pair of MEMS actuators for use with an image sensor according to some embodiments.

FIG. 9 illustrates a plan view of a stacked pair of MEMS actuators for use with an image sensor according to some embodiments. FIG. 9 highlights the general structures of the MEMS device labeled stacked actuator pair 900. In the embodiment shown in FIG. 9, first order calculation estimates indicate ~0.9 mN electrostatic force is generated when 60V is applied to a comb. In the embodiment shown in FIG. 9, the suspension flexures have a stiffness of ~6 mN/mm. In the embodiment shown in FIG. 9, from simulation, 0.8 mN generates ~115 um Z displacement of one corner of the image sensor substrate. In the embodiment shown in FIG. 9, each comb is bi-directional, hence energizing the other half of the comb with −60V generates roughly −115 um. In the embodiment shown in FIG. 9, when in the central neutral position, there is no overlap between the moving and fixed combs to avoid having to fabricate a 5 um gap. In the embodiment shown in FIG. 9, the capacitance will thus be highly non linear with displacement, although it may be characterized and may be used as a position feedback parameter. In the embodiment shown in FIG. 9, to first order, the comb capacitance is '0 pF' at the center of travel, rising to 43 pF at 100 um travel in either direction.

Figure 10A:
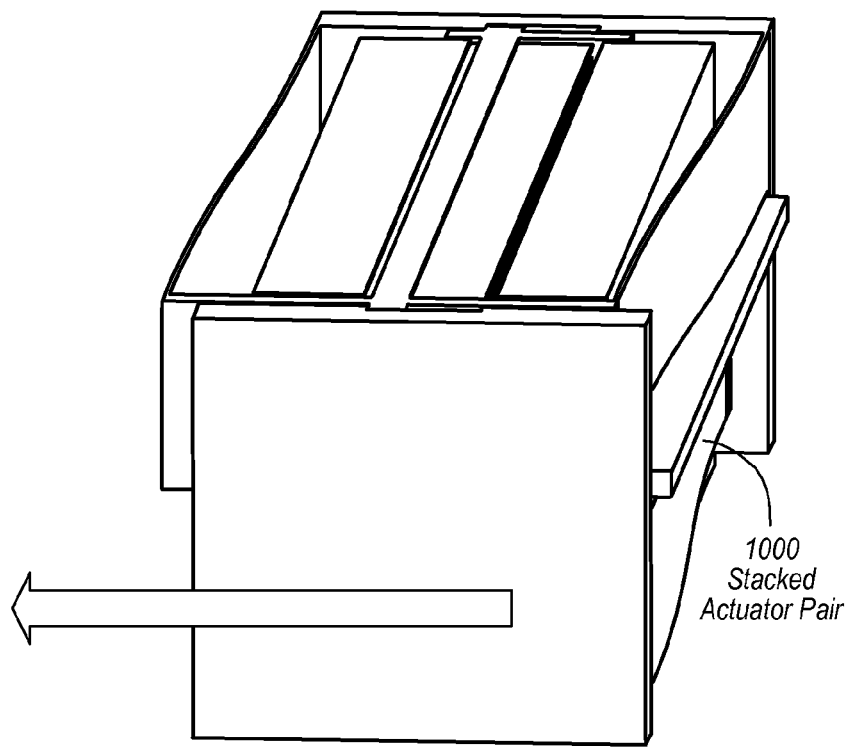
FIGS. 10A-B depict displacement of a stacked pair of MEMS actuators for use with an image sensor according to some embodiments.
Figure 10B:
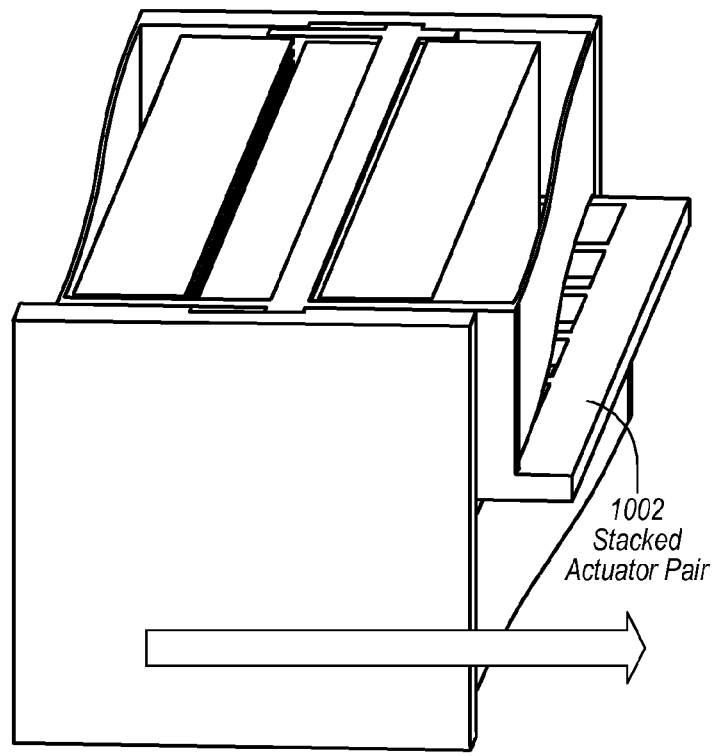

FIGS. 10A-B depict displacement of a stacked pair of MEMS actuators for use with an image sensor according to some embodiments. In the embodiment shown in FIG. 10A, stacked actuator pair 1000 is deflected left. In the embodiment shown in FIG. 10B, stacked actuator pair 1002 is deflected right. In the embodiment shown in FIGS. 10A-B, each OIS comb has 28 fingers that extend along the length of the structure. In the embodiment shown in FIGS. 10A-B, basic first order calculation estimates indicate ~0.8 mN electrostatic force generated when 68V is applied to the comb. In the embodiment shown in FIGS. 10A-B, the suspension flexures have a stiffness of ~10.4 mN/mm. In the embodiment shown in FIGS. 10A-B, from simulation 0.8 mN generates 65 um movement of the image sensor (~85% of the expected analytical displacement), since the linkages are not perfectly stiff, and there are extra stiffnesses from the other linkages. In the embodiment shown in FIGS. 10A-B, 73V generates ~0.9 mN force and ~75 um movement of the image sensor. In the embodiment shown in FIGS. 10A-B, to first order, the comb capacitance is 24 pF at the center of travel, rising to 50 pF at 75 um travel in either direction.

Figure 11:
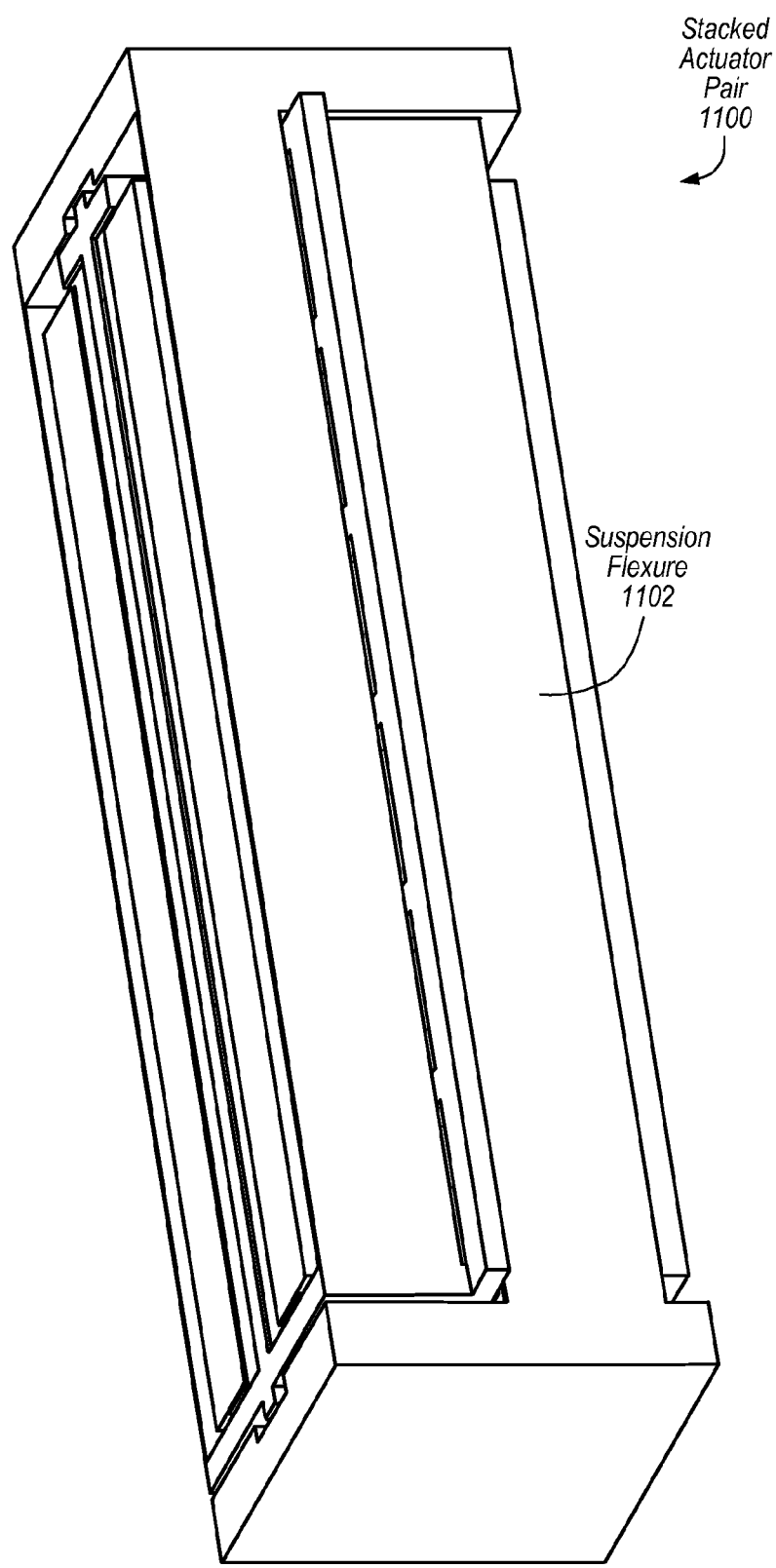
FIG. 11 illustrates a stacked pair of MEMS actuators for use with an image sensor according to some embodiments.

FIG. 11 illustrates a stacked pair of MEMS actuators for use with an image sensor according to some embodiments. A suspension flexure 1100 is shown. In the embodiment shown in FIG. 11, each OIS comb has 28 fingers that extend along the length of the structure. In the embodiment shown in FIG. 11, basic first order calculation estimates indicate ~0.8 mN electrostatic force generated when 68V is applied to the comb. In the embodiment shown in FIG. 11, the suspension flexures have a stiffness of ~10.4 mN/mm. In the embodiment shown in FIG. 11, from simulation 0.8 mN generates 65 um movement of the image sensor (~85% of the expected analytical displacement), since the linkages are not perfectly stiff, and there are extra stiffnesses from the other linkages. In the embodiment shown in FIG. 11, 73V generates ~0.9 mN force and ~75 um movement of the image sensor. In the embodiment shown in FIG. 11, to first order, the comb capacitance is 24 pF at the center of travel, rising to 50 pF at 75 um travel in either direction.

Figure 12:
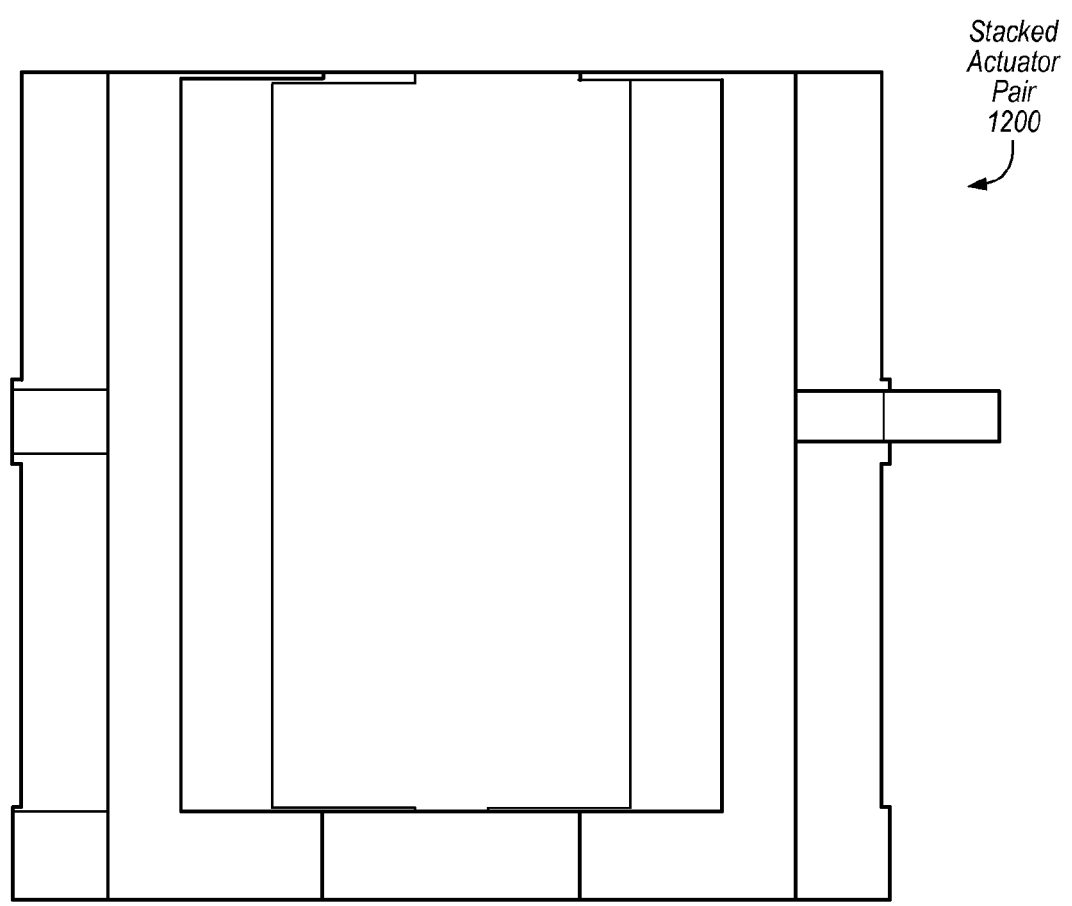
FIG. 12 depicts a MEMS actuator for use with an image sensor according to some embodiments.

FIG. 12 depicts a MEMS actuator for use with an image sensor according to some embodiments. In the embodiment shown in FIG. 12, each OIS comb has 28 fingers that extend along the length of the structure. In the embodiment shown in FIG. 12, basic first order calculation estimates indicate ~0.8 mN electrostatic force generated when 68V is applied to the comb. In the embodiment shown in FIG. 12, the suspension flexures have a stiffness of ~10.4 mN/mm. In the embodiment shown in FIG. 12, from simulation 0.8 mN generates 65 um movement of the image sensor (~85% of the expected analytical displacement), since the linkages are not perfectly stiff, and there are extra stiffnesses from the other linkages. In the embodiment shown in FIG. 12, 73V generates ~0.9 mN force and ~75 um movement of the image sensor. In the embodiment shown in FIG. 12, to first order, the comb capacitance is 24 pF at the center of travel, rising to 50 pF at 75 um travel in either direction. In the embodiment shown in FIG. 12, Four 'thick' fingers correspond to layers with terminal linkages.

Figure 13:
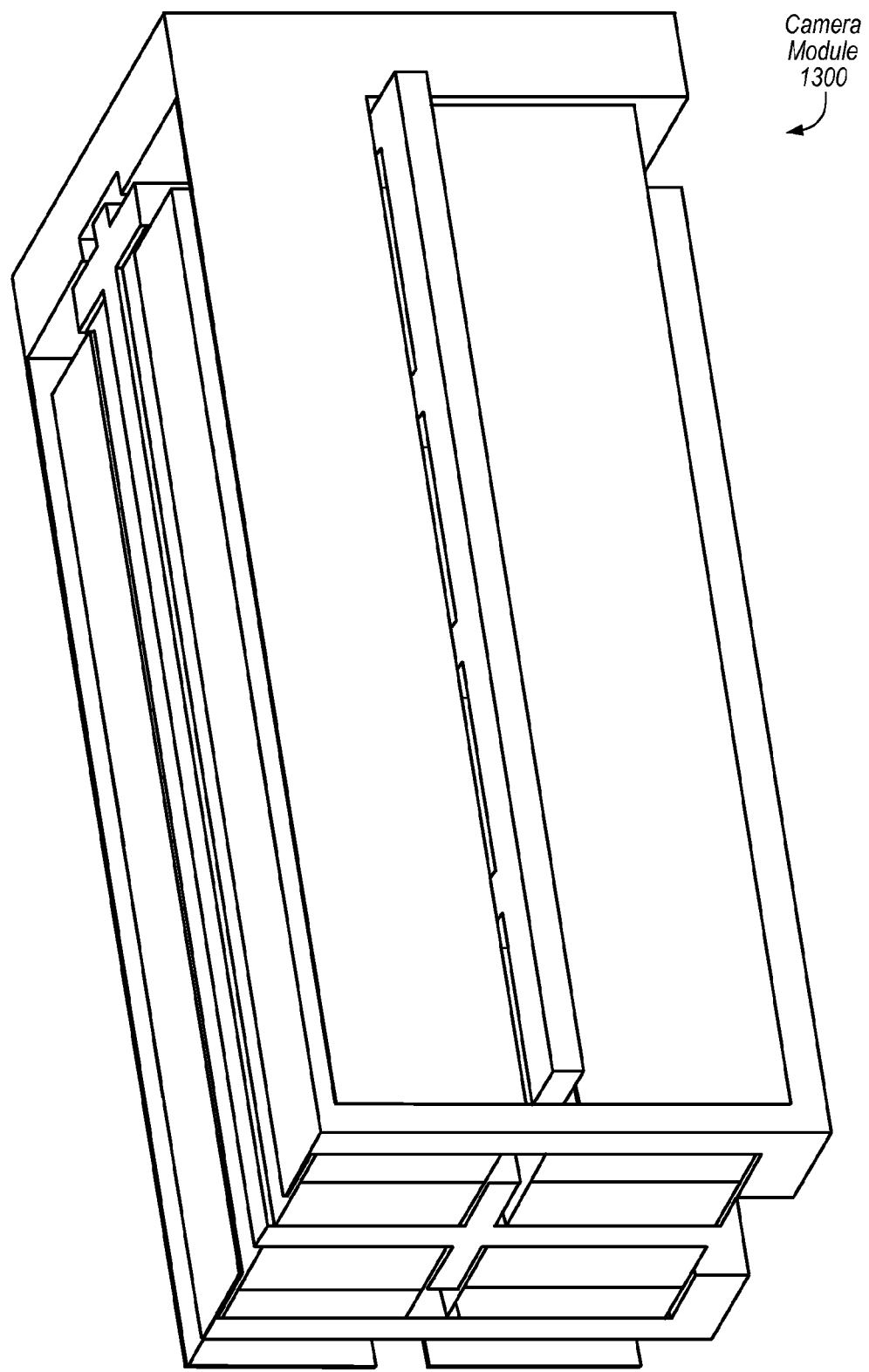
FIG. 13 illustrates a stacked pair of MEMS actuators for use with an image sensor according to some embodiments.

FIG. 13 illustrates a stacked pair of MEMS actuators for use with an image sensor according to some embodiments. In the embodiment shown in FIG. 13, each OIS comb has 28 fingers that extend along the length of the structure. In the embodiment shown in FIG. 13, basic first order calculation estimates indicate ~0.8 mN electrostatic force generated when 68V is applied to the comb. In the embodiment shown in FIG. 13, the suspension flexures have a stiffness of ~10.4 mN/mm. In the embodiment shown in FIG. 13, from simulation 0.8 mN generates 65 um movement of the image sensor (~85% of the expected analytical displacement), since the linkages are not perfectly stiff, and there are extra stiffnesses from the other linkages. In the embodiment shown in FIG. 13, 73V generates ~0.9 mN force and ~75 um movement of the image sensor. In the embodiment shown in FIG. 13, to first order, the comb capacitance is 24 pF at the center of travel, rising to 50 pF at 75 um travel in either direction.

Substrate Assembly

Figure 14:
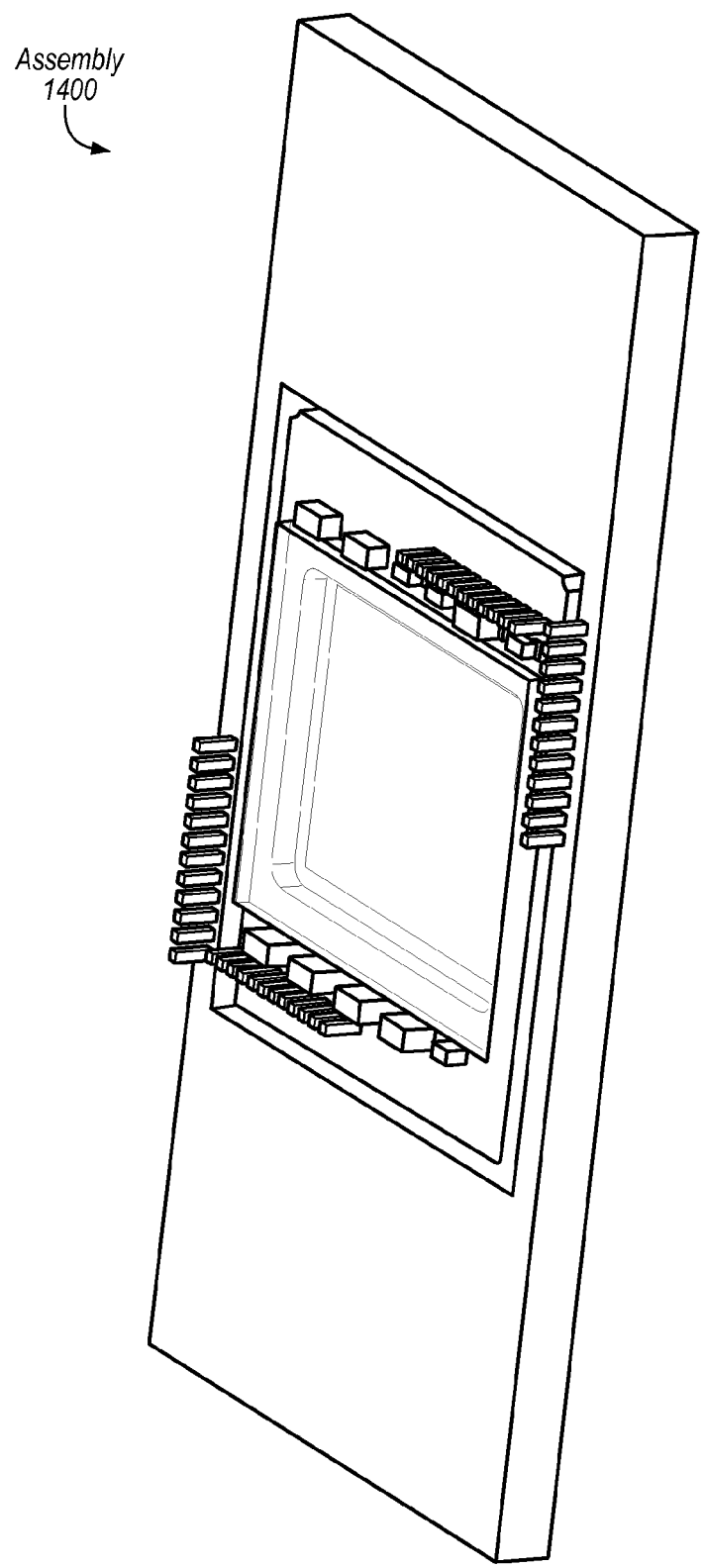
FIG. 14 depicts an image sensor substrate for use with a MEMS actuator and an image sensor according to some embodiments.

FIG. 14 depicts an image sensor substrate for use with a MEMS actuator and an image sensor according to some embodiments. An assembly 1400 is labeled. In the embodiment depicted in FIG. 14, the ceramic substrate shown in two portions linked electrically by L-shaped suspension flexures (other MEMS structures not shown in FIG. 14). In the embodiment depicted in FIG. 14 the ceramic substrate is split into two portions: a moving portion to which the image sensor is flip-chip bonded and a fixed support structure portion on which the MEMS comb-drive actuators are built, and which is ACF bonded to the FPC. In the embodiment depicted in FIG. 14, these two portions are linked electrically to transfer the electrical connections to and from the moving image sensor. In the embodiment depicted in FIG. 14, these are configured as 24 L-shaped suspension flexures in two clusters, each with four layers with three flexures on each layer. In the embodiment depicted in FIG. 14, the L-shape helps make the linkages appropriately compliant in all directions. In the embodiment depicted in FIG. 14, each suspension flexure has a cross-section of 30 um thick and 10 um wide. In the embodiment depicted in FIG. 14, the spacing may be adjusted to aid impedance matching for MIPI. In the embodiment depicted in FIG. 14, passive de-coupling components are mounted on the moving substrate to minimize the number of traces. In the embodiment depicted in FIG. 14, the total stiffness of this linkage structure is approximately X direction 0.83 mN/mm, Y direction 0.77 mN/mm, Z direction 0.59 mN/mm. In the embodiment depicted in FIG. 14, the substrate may be fabricated as two pieces and then held in fixtures during the MEMS process, or fabricated as one piece and then separated by once the MEMS structure is formed.

Figure 15:
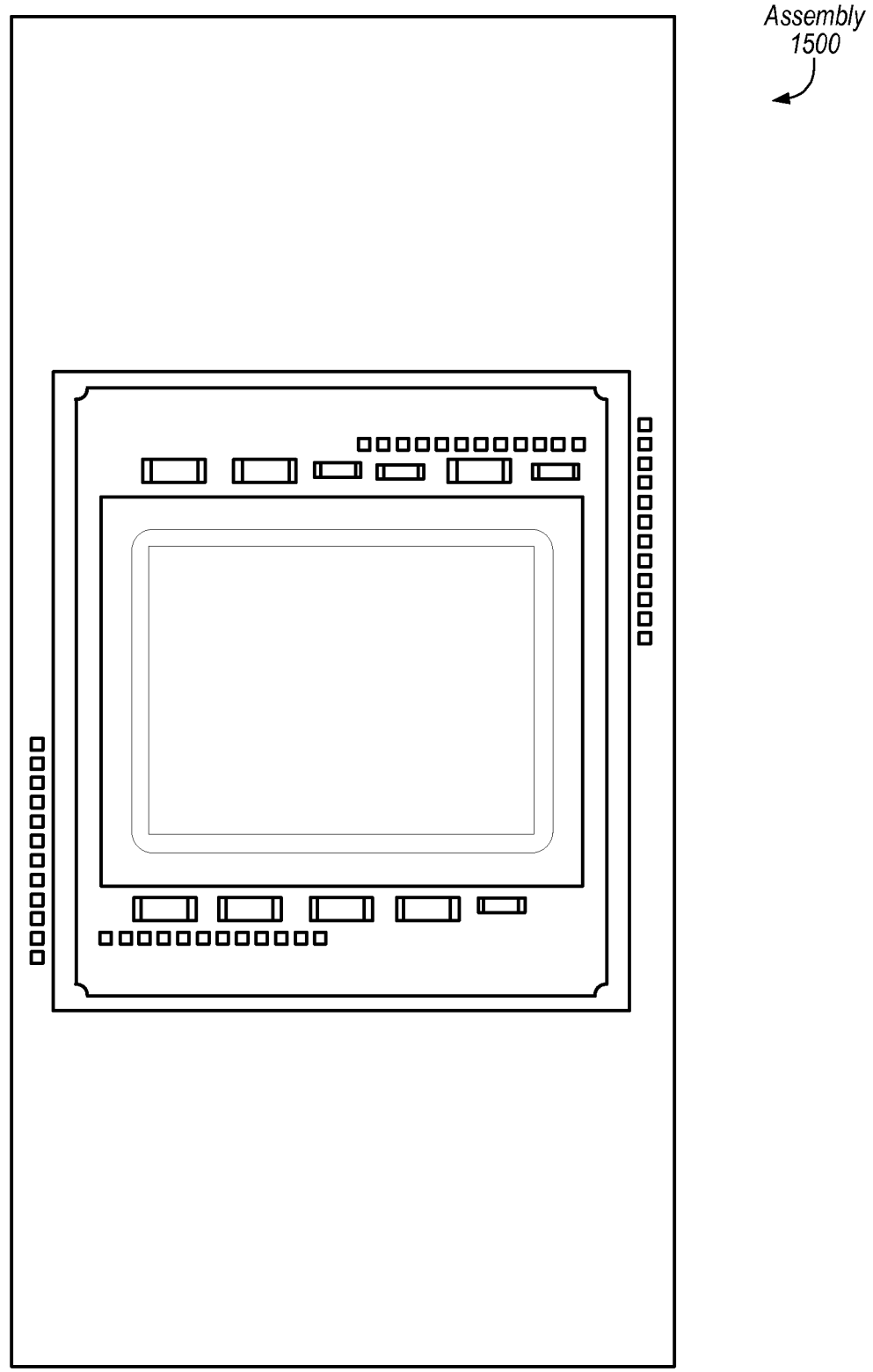
FIG. 15 illustrates a plan view of an image sensor substrate for use with a MEMS actuator and an image sensor according to some embodiments.

FIG. 15 illustrates a plan view of an image sensor substrate for use with a MEMS actuator and an image sensor according to some embodiments. An assembly 1500 is labeled. In the embodiment depicted in FIG. 15, the ceramic substrate shown in two portions linked electrically by L-shaped suspension flexures (other MEMS structures not shown in FIG. 15). In the embodiment depicted in FIG. 15 the ceramic substrate is split into two portions: a moving portion to which the image sensor is flip-chip bonded and a fixed support structure portion on which the MEMS comb-drive actuators are built, and which is ACF bonded to the FPC. In the embodiment depicted in FIG. 15, these two portions are linked electrically to transfer the electrical connections to and from the moving image sensor. In the embodiment depicted in FIG. 15, these are configured as 24 L-shaped suspension flexures in two clusters, each with four layers with three flexures on each layer. In the embodiment depicted in FIG. 15, the L-shape helps make the linkages appropriately compliant in all directions. In the embodiment depicted in FIG. 15, each suspension flexure has a cross-section of 30 um thick and 10 um wide. In the embodiment depicted in FIG. 15, the spacing may be adjusted to aid impedance matching for MIPI. In the embodiment depicted in FIG. 15, passive de-coupling components are mounted on the moving substrate to minimize the number of traces. In the embodiment depicted in FIG. 15, the total stiffness of this linkage structure is approximately X direction 0.83 mN/mm, Y direction 0.77 mN/mm, Z direction 0.59 mN/mm. In the embodiment depicted in FIG. 15, the substrate may be fabricated as two pieces and then held in fixtures during the MEMS process, or fabricated as one piece and then separated by once the MEMS structure is formed.

Figure 16:
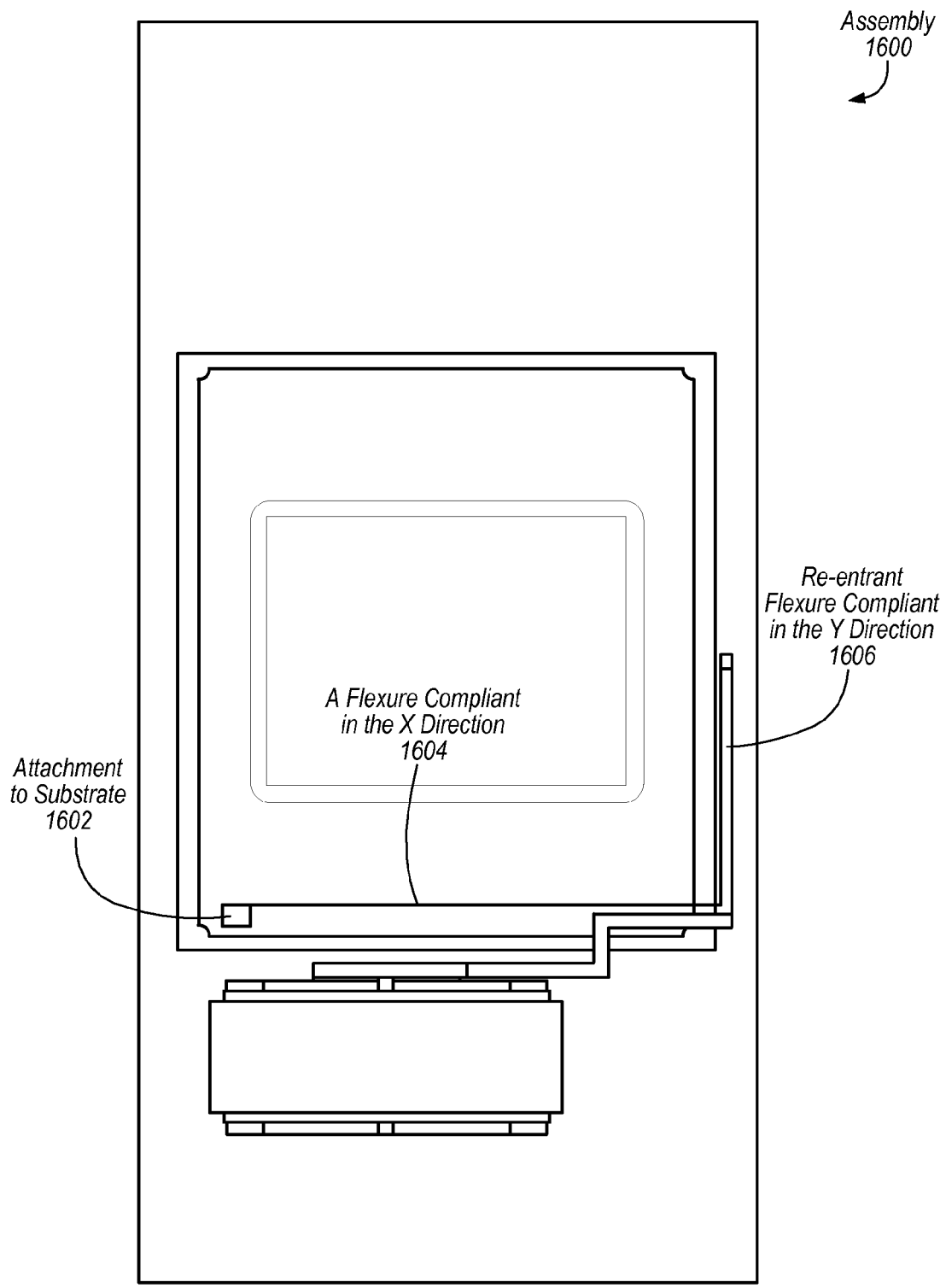
FIG. 16 depicts an image sensor substrate linked to a MEMS actuator leaf-spring flexure for use with an image sensor according to some embodiments.

FIG. 16 depicts an image sensor substrate linked to a MEMS actuator leaf-spring flexure for use with an image sensor according to some embodiments. An attachment to substrate 1602, a flexure compliant in the X direction 1604 and a re-entrant flexure compliant in the Y direction 1606 are shown. In the embodiment shown in FIG. 16, the plan view illustration shows a linkage connecting the moving part of an AF comb drive to the moving image sensor substrate. In the embodiment shown in FIG. 16, all other MEMS structures are not shown. In the embodiment shown in FIG. 16, two AF combs are stacked on top of each other. In the embodiment shown in FIG. 16, the linkages are designed to minimize the stiffness in X and Y directions, whilst maximizing the stiffness in the Z direction. In the embodiment shown in FIG. 16, this allows the transfer the forces and movements from the AF Combs to the corners of the substrate. In the embodiment shown in FIG. 16, this also accommodates the independent motions and forces from the OIS combs. In the embodiment shown in FIG. 16, note that since the applied voltages (and hence forces and displacements) of each comb can be separately controlled, these four combs can control three degrees of freedom of the image sensor substrate (The linear movement in the Z direction, Tilt about the X axis, Tilt about the Y axis). In the embodiment shown in FIG. 16, in principle only three combs are required, however the generally rectilinear shape of the substrate means that four combs are more efficient to package.

Figure 17:
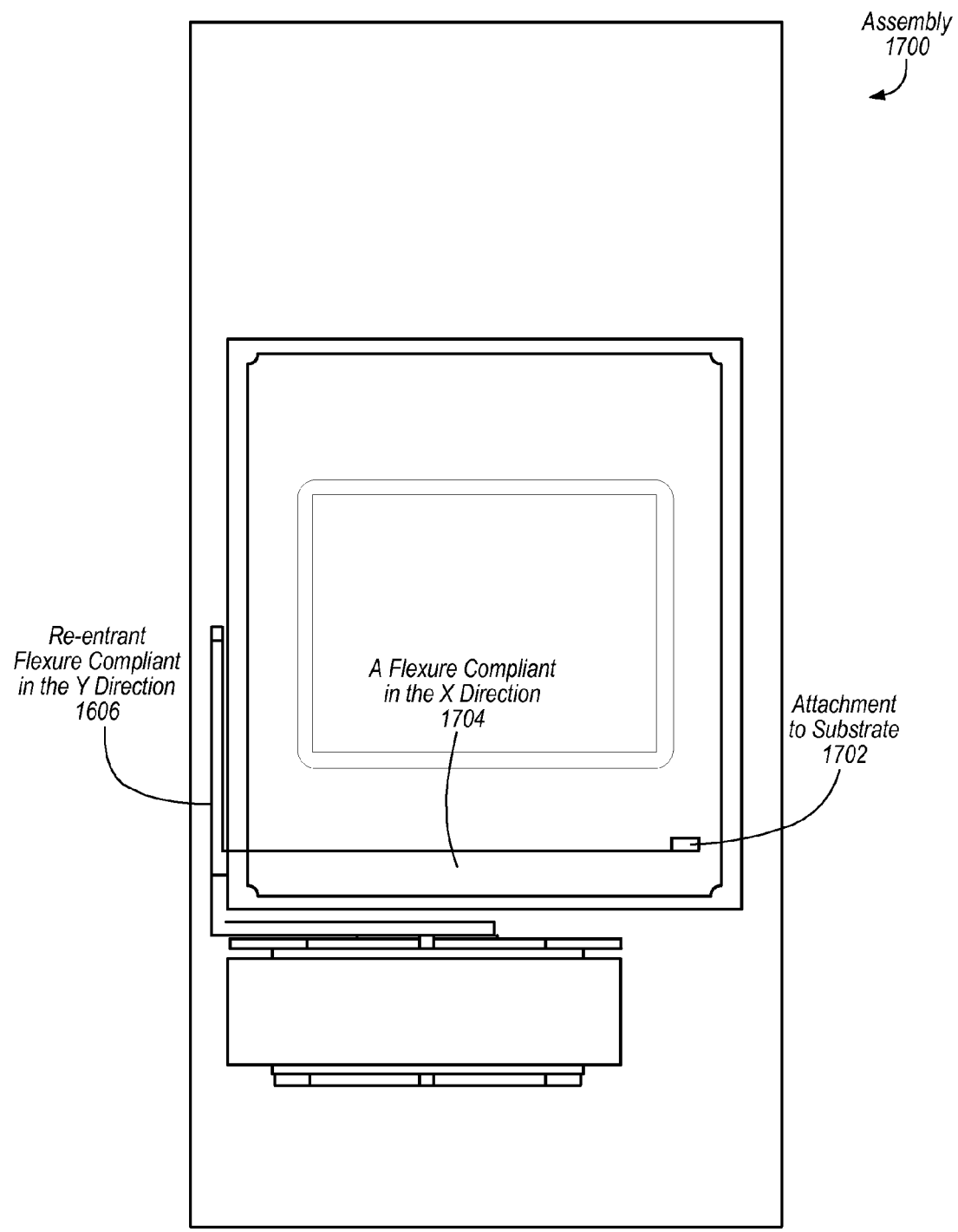
FIG. 17 illustrates an image sensor substrate linked to a MEMS actuator leaf-spring flexure for use with an image sensor according to some embodiments.

FIG. 17 illustrates an image sensor substrate linked to a MEMS actuator leaf-spring flexure for use with an image sensor according to some embodiments. An attachment to substrate 1702, a flexure compliant in the X direction 1704 and a re-entrant flexure compliant in the Y direction 1706 are shown. In the embodiment shown in FIG. 17, the plan view illustration shows a linkage connecting the moving part of an AF comb drive to the moving image sensor substrate. In the embodiment shown in FIG. 17, all other MEMS structures are not shown. In the embodiment shown in FIG. 17, two AF combs are stacked on top of each other. In the embodiment shown in FIG. 17, the linkages are designed to minimize the stiffness in X and Y directions, whilst maximizing the stiffness in the Z direction. In the embodiment shown in FIG. 17, this allows the transfer the forces and movements from the AF Combs to the corners of the substrate. In the embodiment shown in FIG. 17, this also accommodates the independent motions and forces from the OIS combs. In the embodiment shown in FIG. 17, note that since the applied voltages (and hence forces and displacements) of each comb can be separately controlled, these four combs can control three degrees of freedom of the image sensor substrate (The linear movement in the Z direction, Tilt about the X axis, Tilt about the Y axis). In the embodiment shown in FIG. 17, in principle only three combs are required, however the generally rectilinear shape of the substrate means that four combs are more efficient to package.

Figure 18:
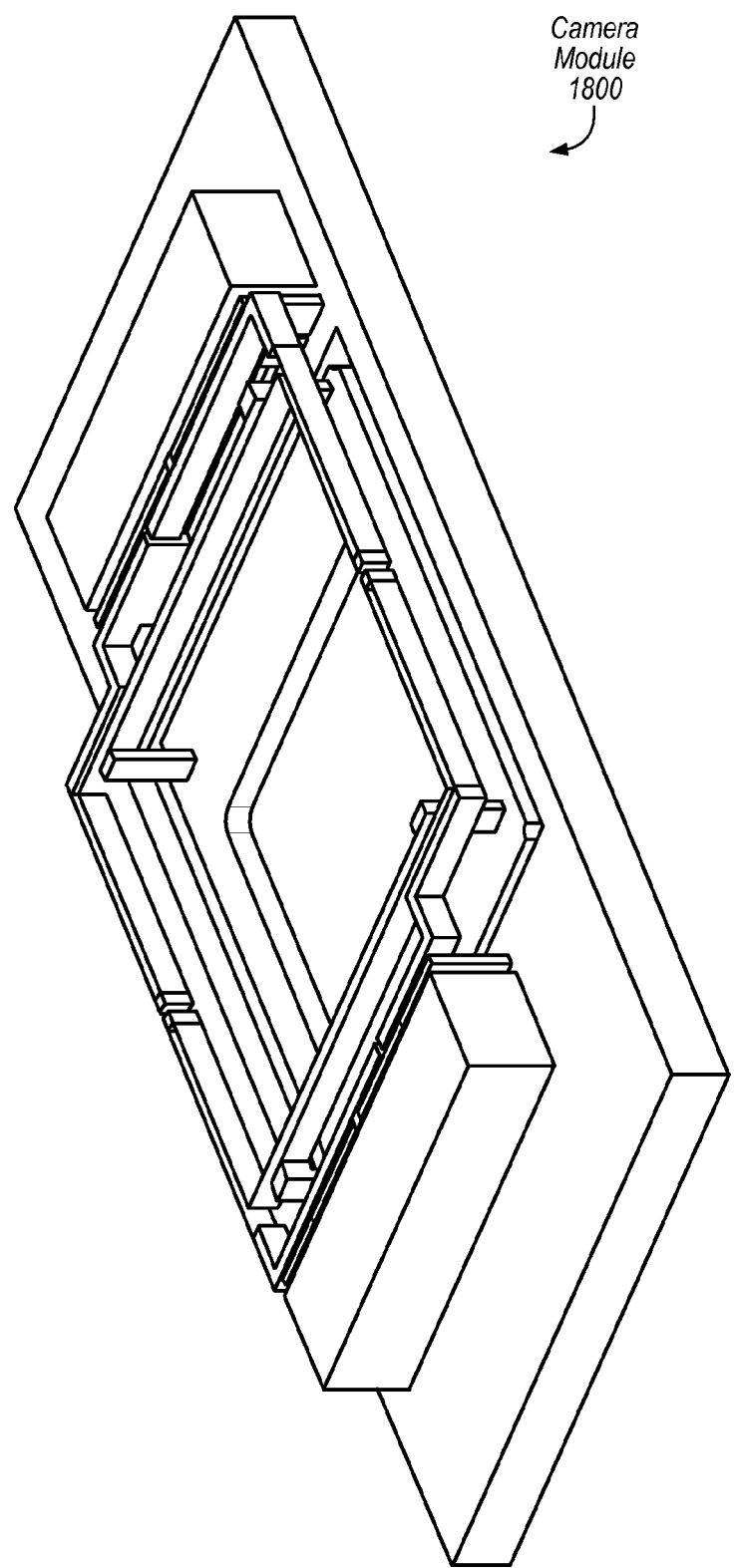
FIG. 18 depicts an image sensor substrate linked to a MEMS actuator leaf-spring flexure for use with an image sensor according to some embodiments.

FIG. 18 depicts an image sensor substrate linked to a MEMS actuator leaf-spring flexure for use with an image sensor according to some embodiments. The lower perspective illustration shows all four AF combs, each with its linkage to the image sensor substrate. Other MEMS structures not shown. In the embodiment shown in FIG. 18, two AF combs are stacked on top of each other. In the embodiment shown in FIG. 18, the linkages are designed to minimize the stiffness in X and Y directions, whilst maximizing the stiffness in the Z direction. In the embodiment shown in FIG. 18, this allows the transfer the forces and movements from the AF Combs to the corners of the substrate. In the embodiment shown in FIG. 18, this also accommodates the independent motions and forces from the OIS combs. In the embodiment shown in FIG. 18, note that since the applied voltages (and hence forces and displacements) of each comb can be separately controlled, these four combs can control three degrees of freedom of the image sensor substrate (The linear movement in the Z direction, Tilt about the X axis, Tilt about the Y axis). In the embodiment shown in FIG. 18, in principle only three combs are required, however the generally rectilinear shape of the substrate means that four combs are more efficient to package.

Figure 19:
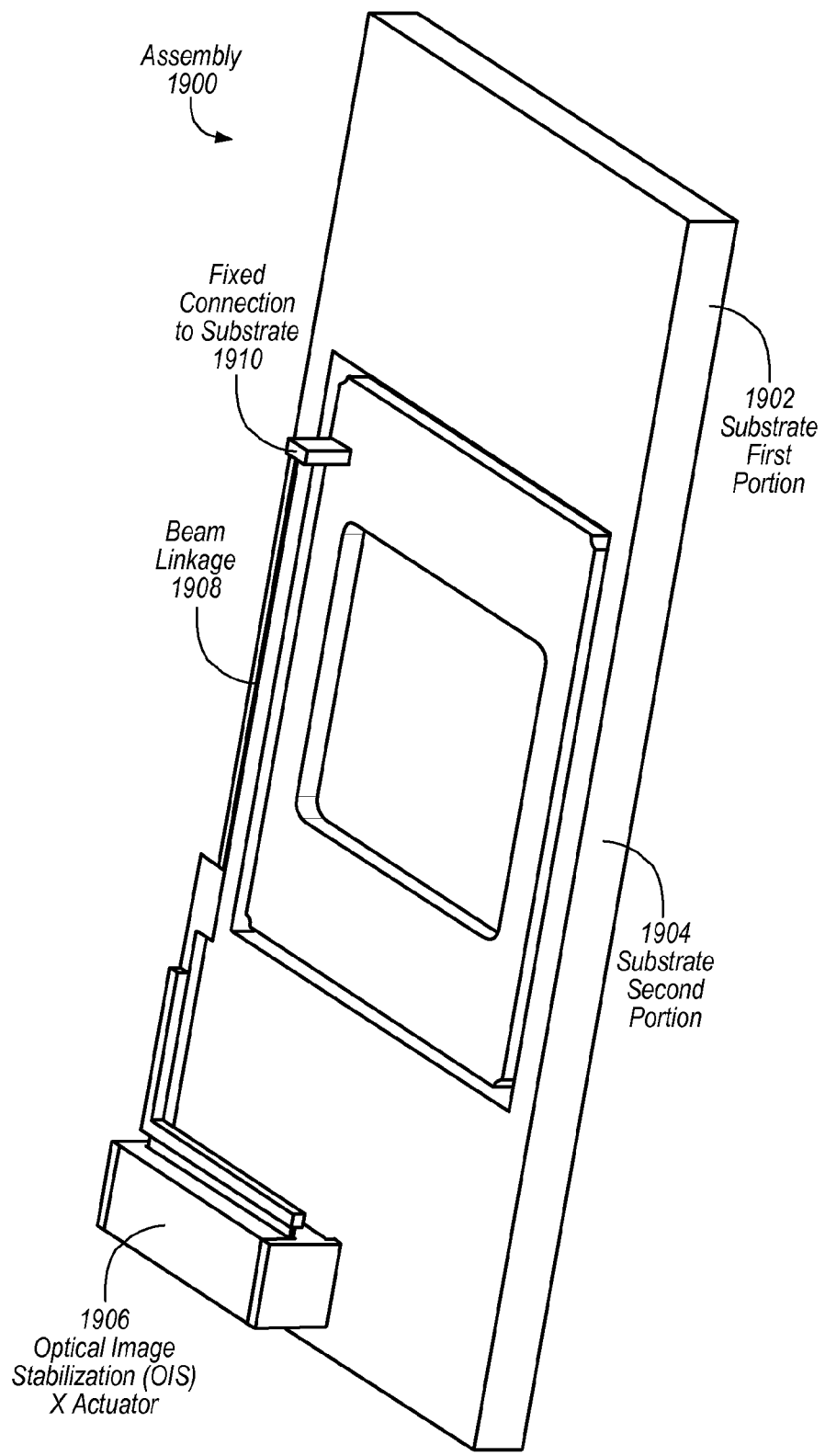
FIG. 19 illustrates an image sensor substrate for use with a MEMS actuator and an image sensor according to some embodiments.

FIG. 19 illustrates an image sensor substrate for use with a MEMS actuator and an image sensor according to some embodiments. Assembly 1900 includes a substrate first portion 1902, a substrate second portion 1904, an OIS X actuator 1906, a beam linkage 1908 and a fixed attachment to substrate 1910. In the embodiment shown in FIG. 19, the illustrations show the linkages between the OIS combs and the moving Image Sensor substrate. Each linkage has a 'stiff' portion and then a portion that is a thin beam. The thin beam is relatively stiff along its length and hence can transfer the forces and displacements of its comb to a corner of the substrate. The thin beam is relatively compliant in directions orthogonal to the load directions from the comb, and hence can accommodate the motions from the other combs. Together, these four combs can control the movement of the image sensor substrate in three degrees of freedom. (Linear movement in X, Linear movement in Y, and Rotations about the Z axis. All three axes represent valuable adjustments of the image sensor position to correct for user handshake.

Figure 20:
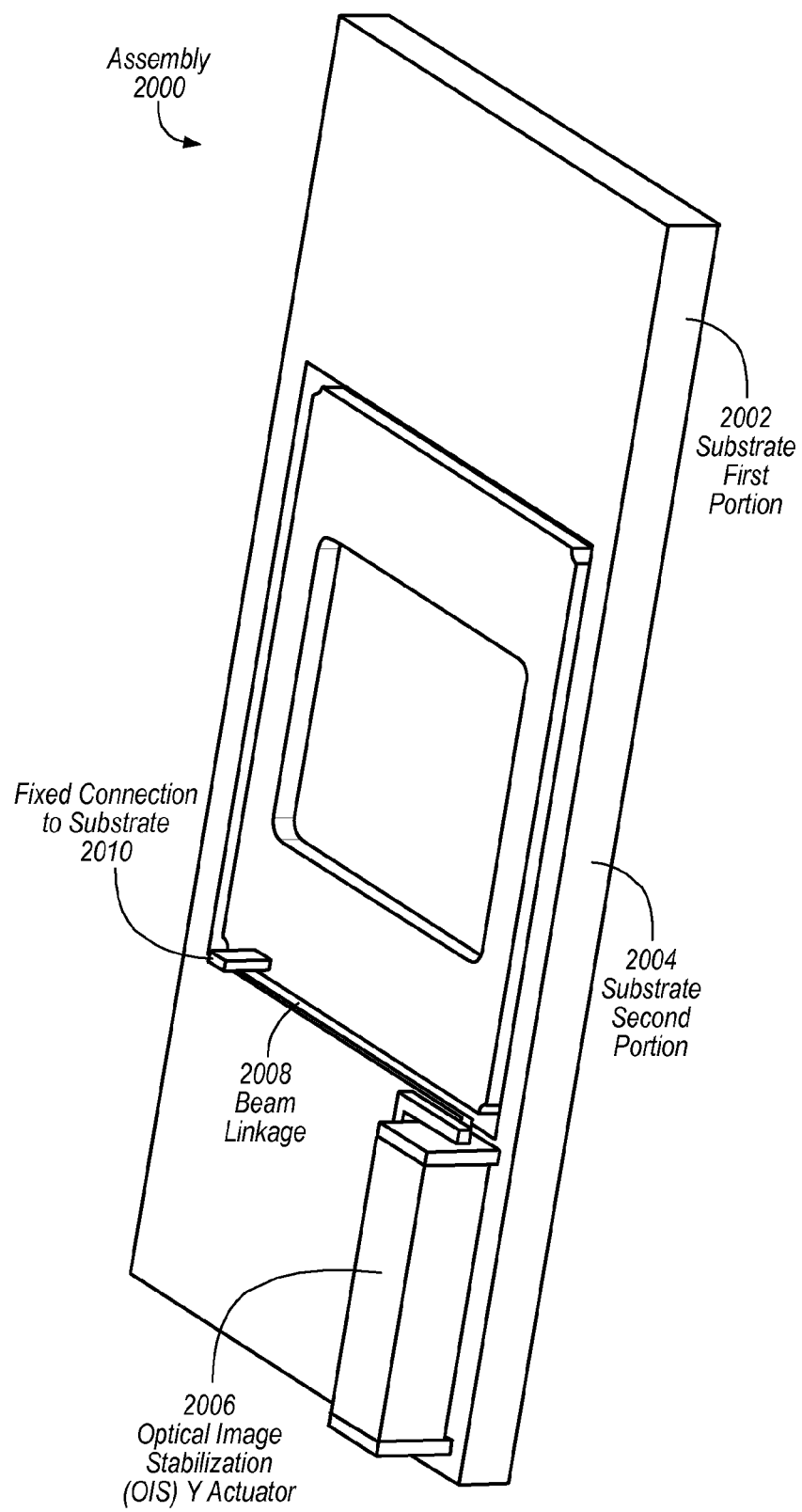
FIG. 20 depicts an image sensor substrate linked to a MEMS actuator leaf-spring flexure for use with an image sensor according to some embodiments.

FIG. 20 depicts an image sensor substrate linked to a MEMS actuator leaf-spring flexure for use with an image sensor according to some embodiments. Assembly 2000 includes a substrate first portion 2002, a substrate second portion 2004, an OIS Y actuator 2006, a beam linkage 2008 and a fixed attachment to substrate 2010. In the embodiment shown in FIG. 20, the illustrations show the linkages between the OIS combs and the moving Image Sensor substrate. Each linkage has a 'stiff' portion and then a portion that is a thin beam. The thin beam is relatively stiff along its length and hence can transfer the forces and displacements of its comb to a corner of the substrate. The thin beam is relatively compliant in directions orthogonal to the load directions from the comb, and hence can accommodate the motions from the other combs. Together, these four combs can control the movement of the image sensor substrate in three degrees of freedom. (Linear movement in X, Linear movement in Y, and Rotations about the Z axis. All three axes represent valuable adjustments of the image sensor position to correct for user handshake.

Figure 21:
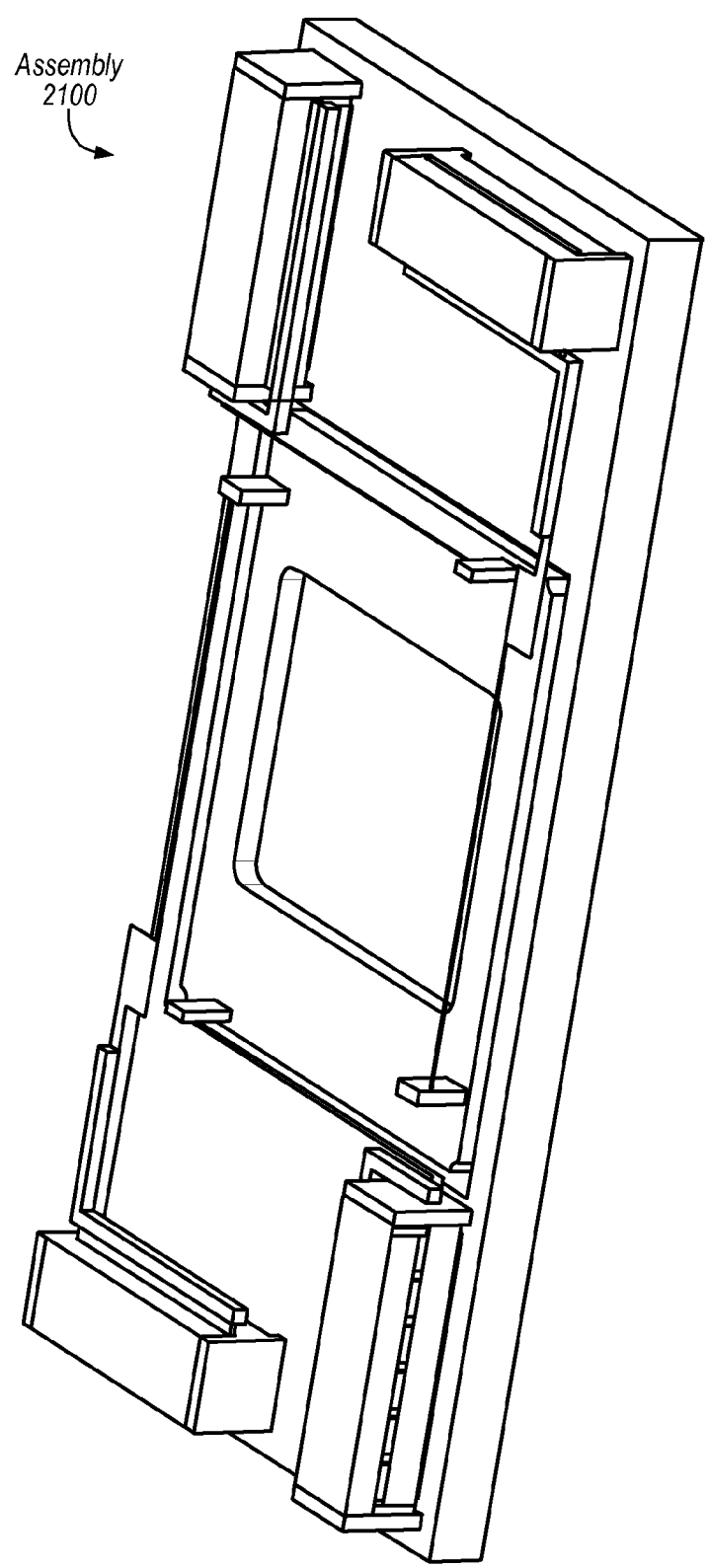
FIG. 21 illustrates an image sensor substrate linked to a MEMS actuator leaf-spring flexure for use with an image sensor according to some embodiments.

FIG. 21 illustrates an image sensor substrate linked to a MEMS actuator leaf-spring flexure for use with an image sensor according to some embodiments. Assembly 2100 includes all four OIS combs and linkages (other MEMS structures not shown).

Figure 22:
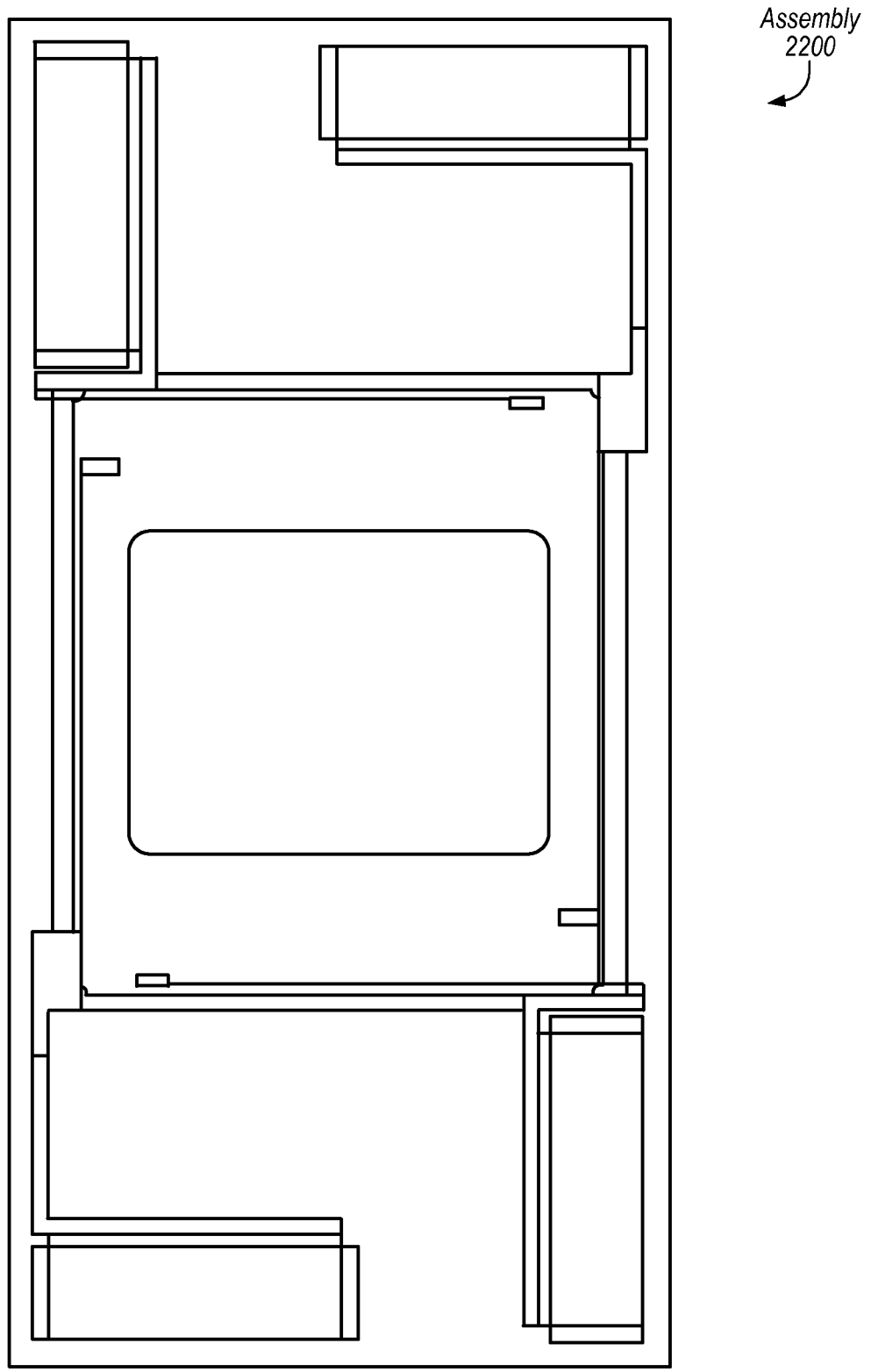
FIG. 22 depicts a plan view an image sensor substrate linked to a MEMS actuator leaf-spring flexure for use with an image sensor according to some embodiments.

FIG. 22 depicts a plan view an image sensor substrate linked to a MEMS actuator leaf-spring flexure for use with an image sensor according to some embodiments. Assembly 2200 includes all four OIS combs and linkages (other MEMS structures not shown).

Figure 23:
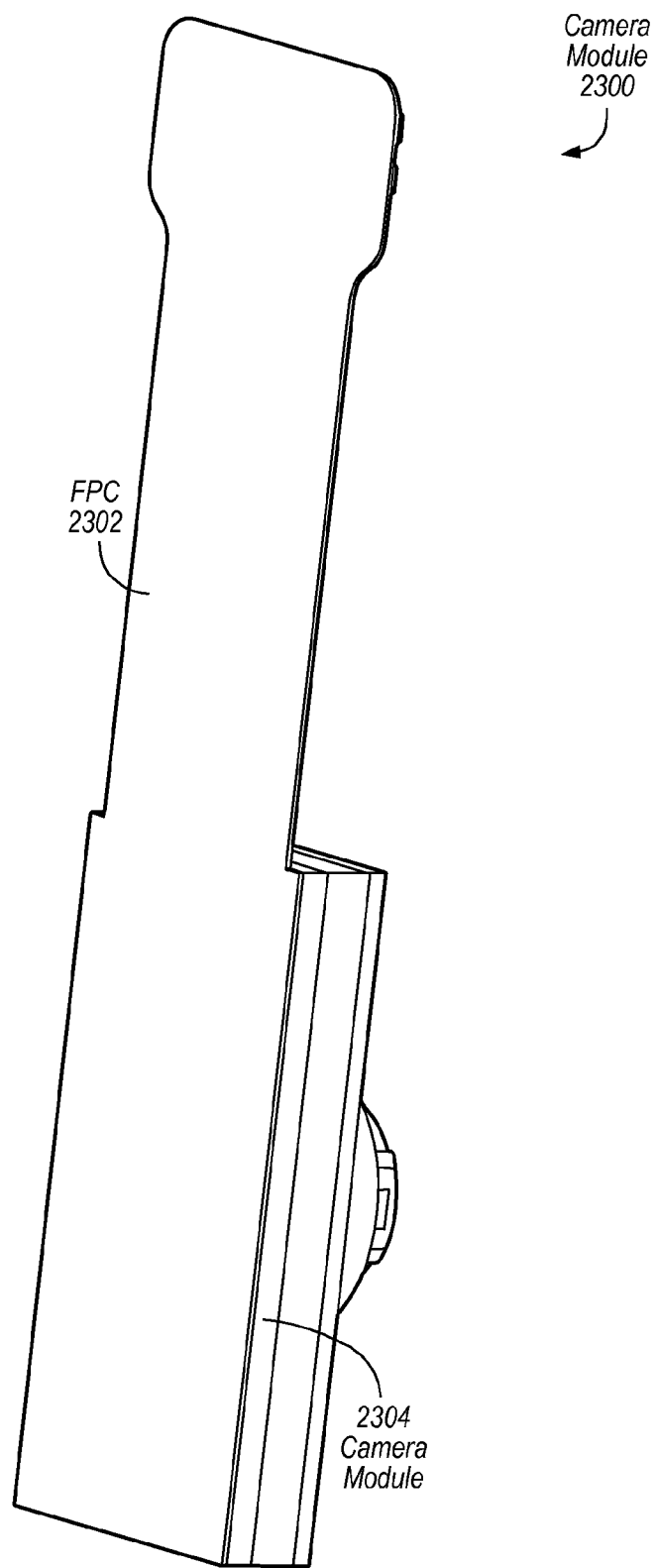
FIG. 23 illustrates an underside view of a camera module with a MEMS actuator for use with an image sensor according to some embodiments.

FIG. 23 illustrates an underside view of a camera module with a MEMS actuator for use with an image sensor according to some embodiments. A camera module 2300 is shown with a flexible printed circuit 2302 bonded to the ceramic substrate 2304.

Figure 24:
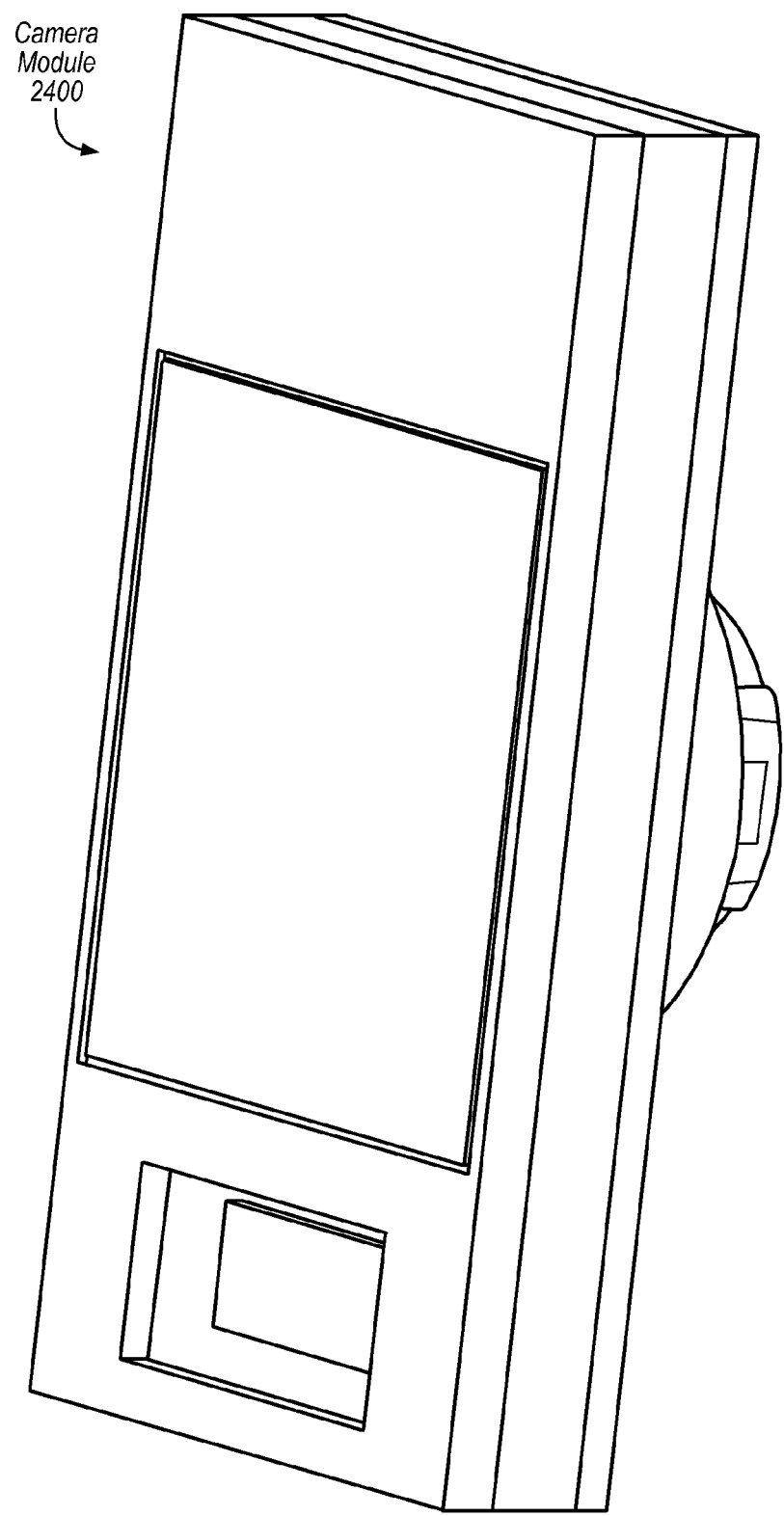
FIG. 24 depicts an underside view of a camera module with a MEMS actuator for use with an image sensor according to some embodiments.

FIG. 24 depicts an underside view of a camera module with a MEMS actuator for use with an image sensor according to some embodiments. A camera module 2400 is shown. The actuator driver is embedded in a recess in the ceramic substrate. A metal sheet seals and protect the image sensor and the actuator enclosure. The metal sheet may electrically shield the sensor and protect the image sensor from loads from the bottom of the module and during ACF bonding. It also maintains the clearance beneath the image sensor to allow for movement.

Figure 25:
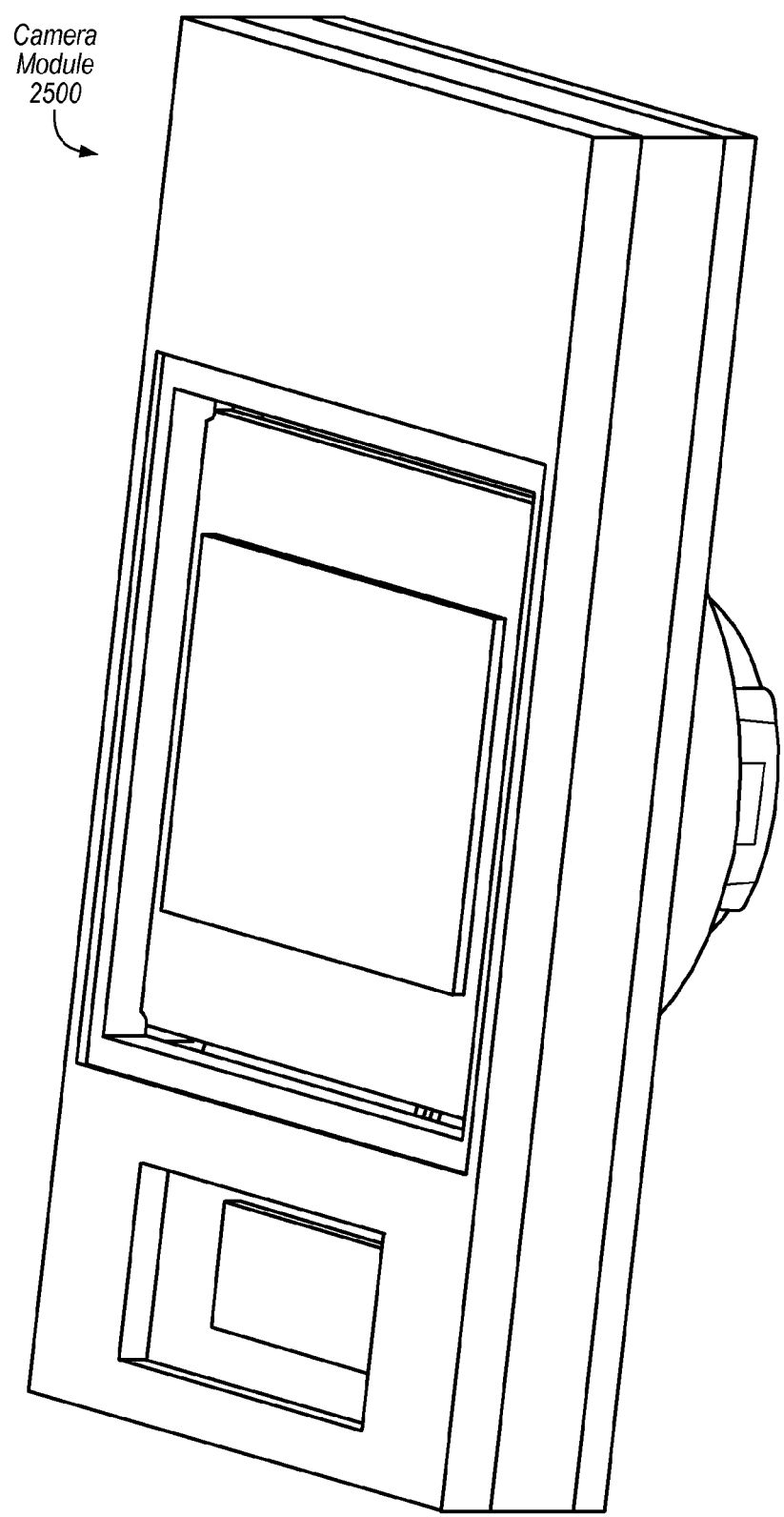
FIG. 25 illustrates an underside view of a camera module with a MEMS actuator for use with an image sensor according to some embodiments.

FIG. 25 illustrates an underside view of a camera module with a MEMS actuator for use with an image sensor according to some embodiments. A camera module 2500 is shown. The actuator driver is embedded in a recess in the ceramic substrate. A metal sheet seals and protect the image sensor and the actuator enclosure. The metal sheet may electrically shield the sensor and protect the image sensor from loads from the bottom of the module and during ACF bonding. It also maintains the clearance beneath the image sensor to allow for movement.

Movement Characteristics of MEMS Actuators

Figure 26:
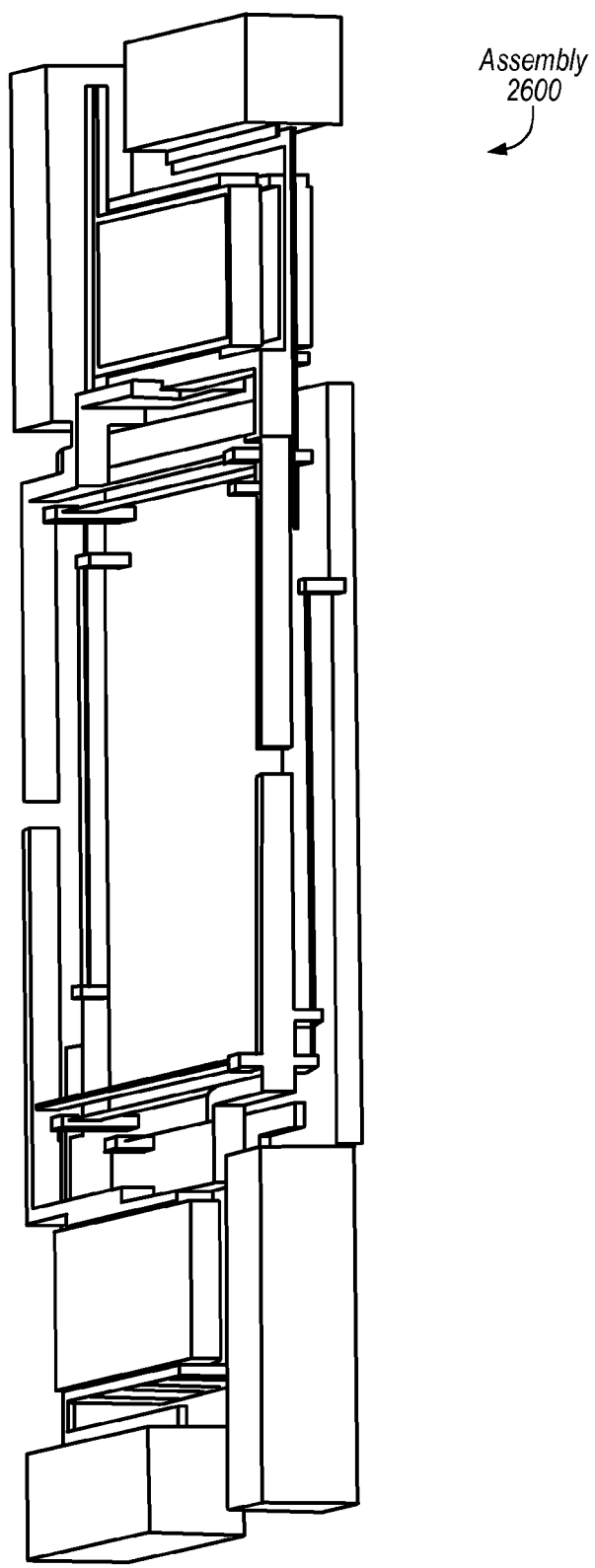
FIG. 26 depicts movement of an image sensor substrate linked to a MEMS actuator leaf-spring flexure for use with an image sensor according to some embodiments.

FIG. 26 depicts movement of an image sensor substrate linked to a MEMS actuator leaf-spring flexure for use with an image sensor according to some embodiments. Assembly 2600 is shown in autofocus Z motion.

Figure 27:
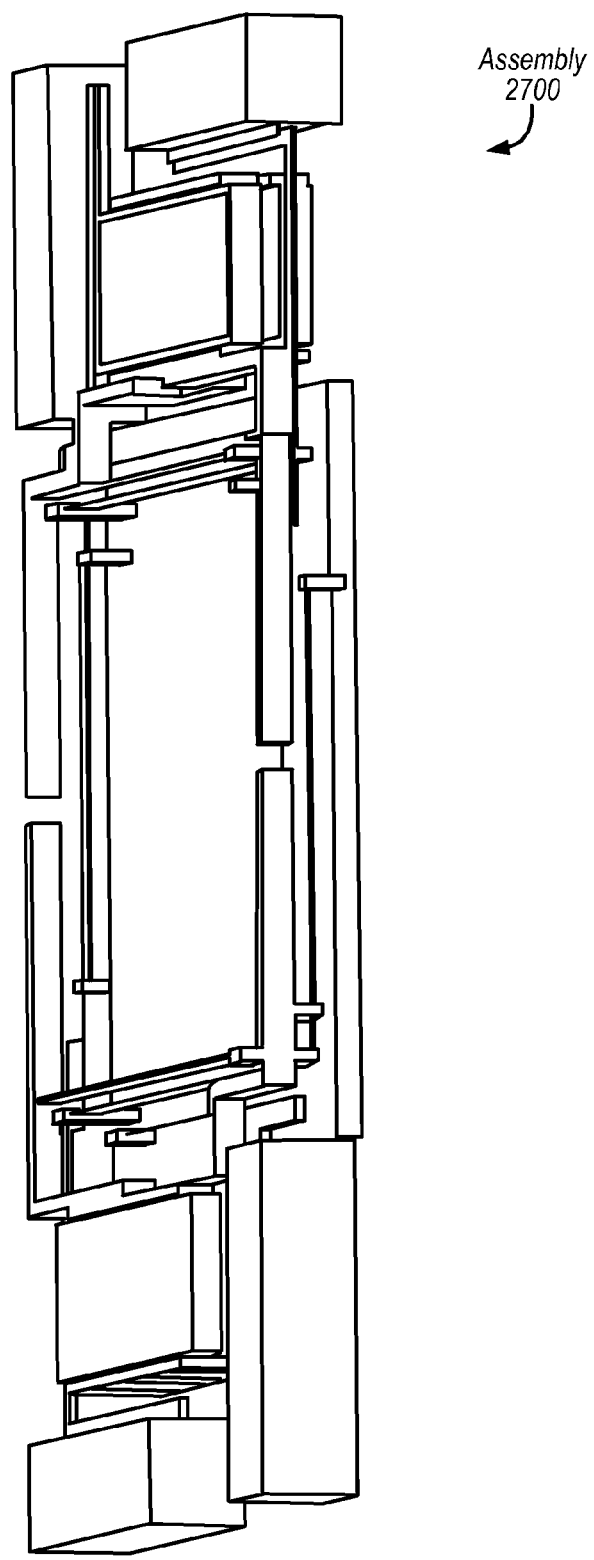
FIG. 27 illustrates movement of an image sensor substrate linked to a MEMS actuator leaf-spring flexure for use with an image sensor according to some embodiments.

FIG. 27 illustrates movement of an image sensor substrate linked to a MEMS actuator leaf-spring flexure for use with an image sensor according to some embodiments. Assembly 2700 is shown in tilt motion about a Y axis.

Figure 28:
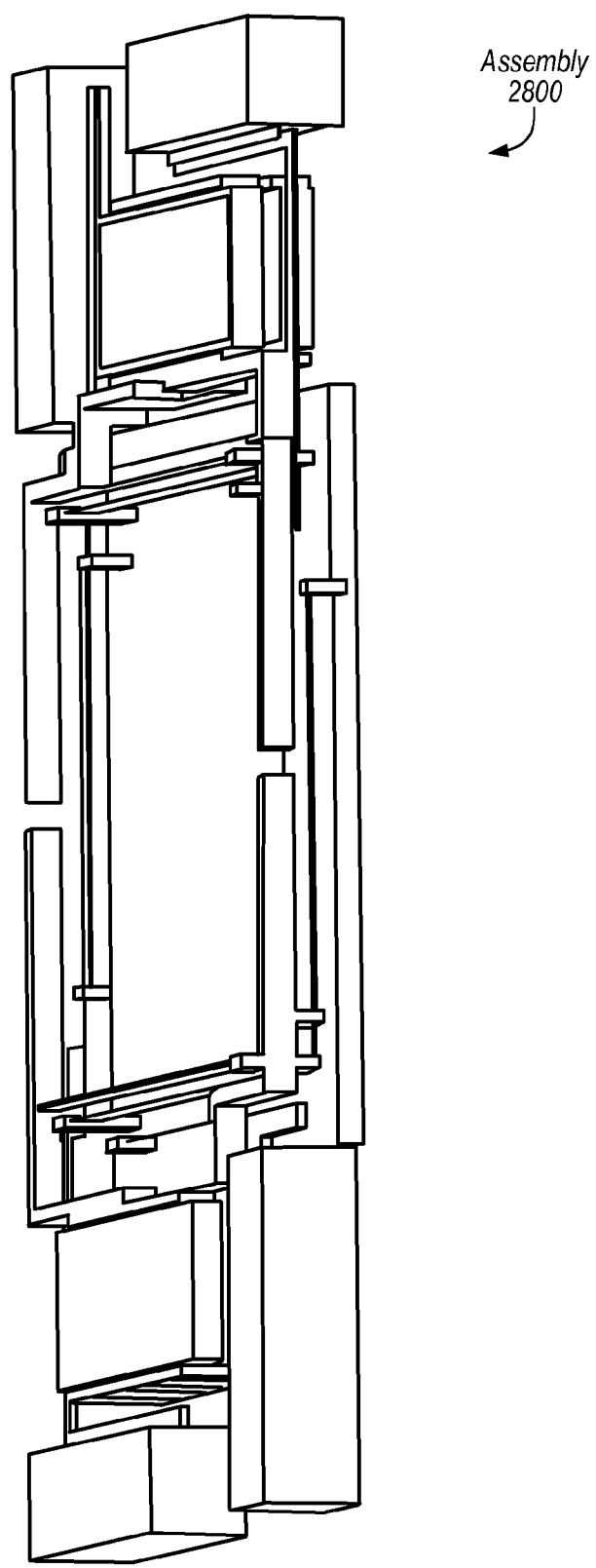
FIG. 28 depicts movement of an image sensor substrate linked to a MEMS actuator leaf-spring flexure for use with an image sensor according to some embodiments.

FIG. 28 depicts movement of an image sensor substrate linked to a MEMS actuator leaf-spring flexure for use with an image sensor according to some embodiments. Assembly 2800 is shown in tilt motion about an X axis.

Figure 29:
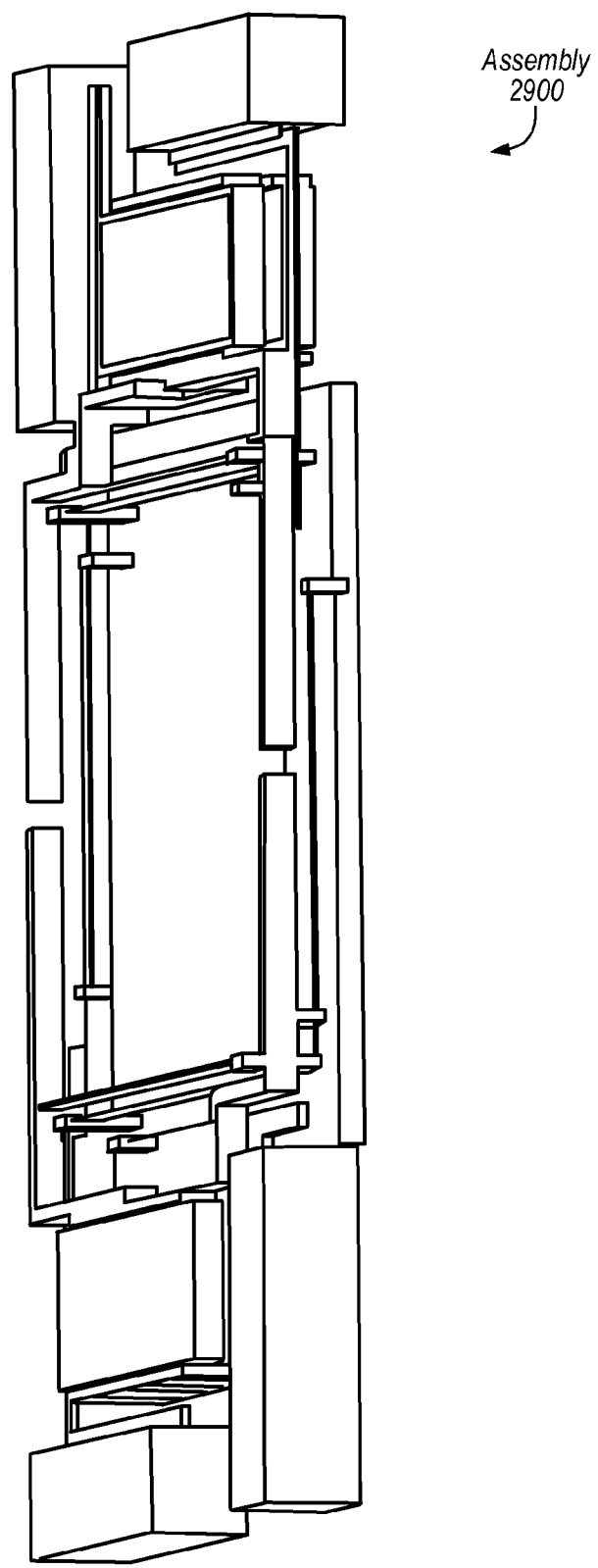
FIG. 29 illustrates movement of an image sensor substrate linked to a MEMS actuator leaf-spring flexure for use with an image sensor according to some embodiments.

FIG. 29 illustrates movement of an image sensor substrate linked to a MEMS actuator leaf-spring flexure for use with an image sensor according to some embodiments. Assembly 2900 is shown in optical image stabilization motion about on a Y axis.

Figure 30:
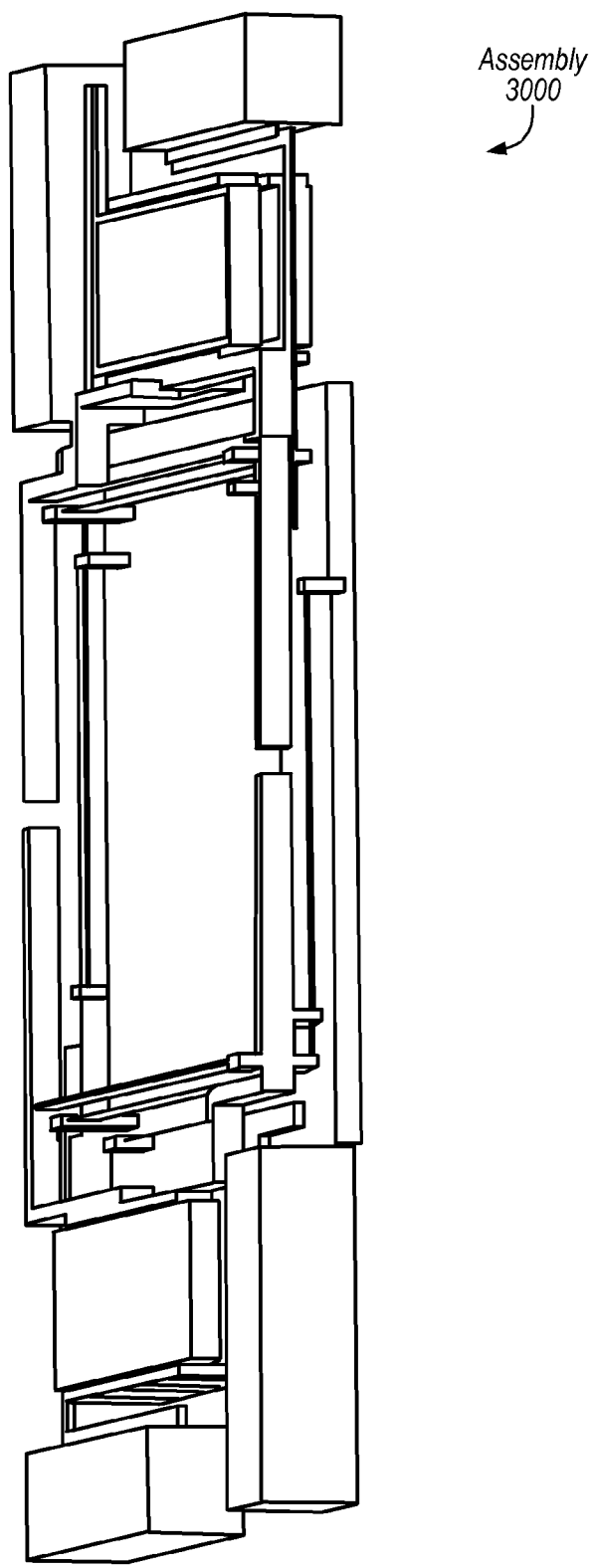
FIG. 30 depicts movement of an image sensor substrate linked to a MEMS actuator leaf-spring flexure for use with an image sensor according to some embodiments.

FIG. 30 depicts movement of an image sensor substrate linked to a MEMS actuator leaf-spring flexure for use with an image sensor according to some embodiments. Assembly 3000 is shown in optical image stabilization motion about on an X axis.

Figure 31:
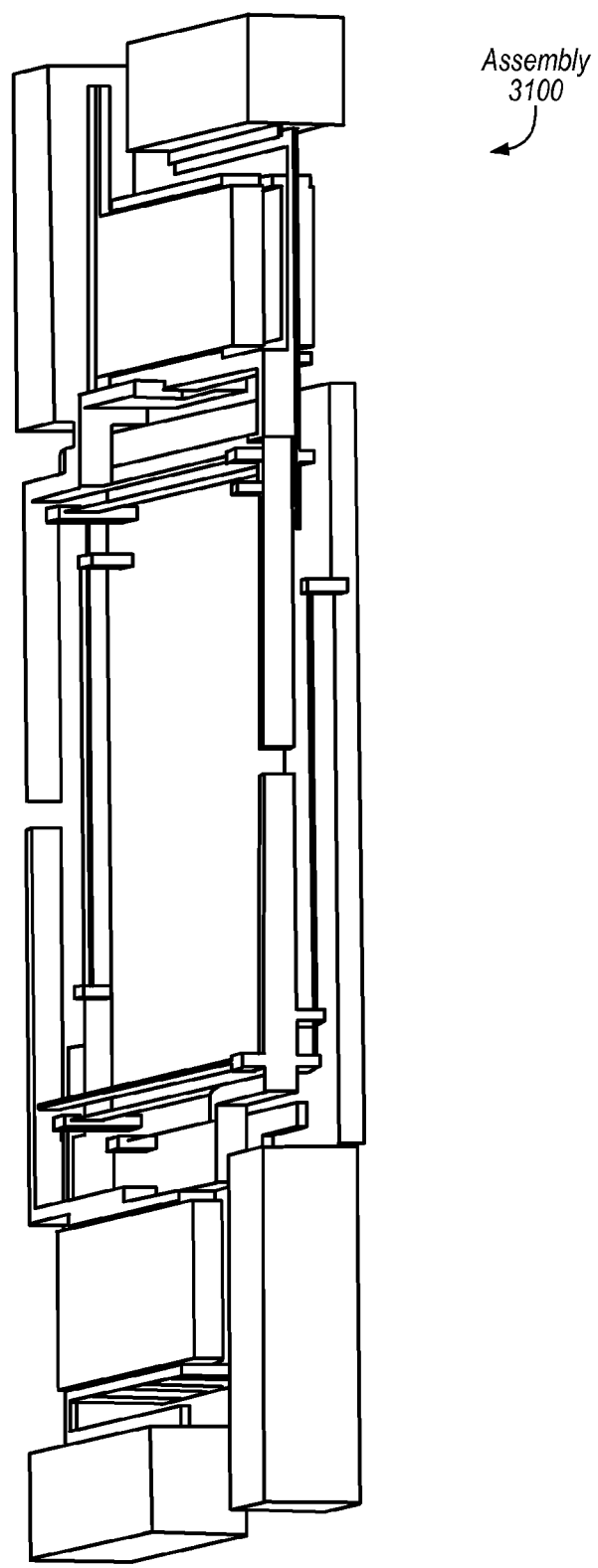
FIG. 31 illustrates movement of an image sensor substrate linked to a MEMS actuator leaf-spring flexure for use with an image sensor according to some embodiments.

FIG. 31 illustrates movement of an image sensor substrate linked to a MEMS actuator leaf-spring flexure for use with an image sensor according to some embodiments. Assembly 3100 is shown in optical image stabilization motion for a roll.

Figure 32:
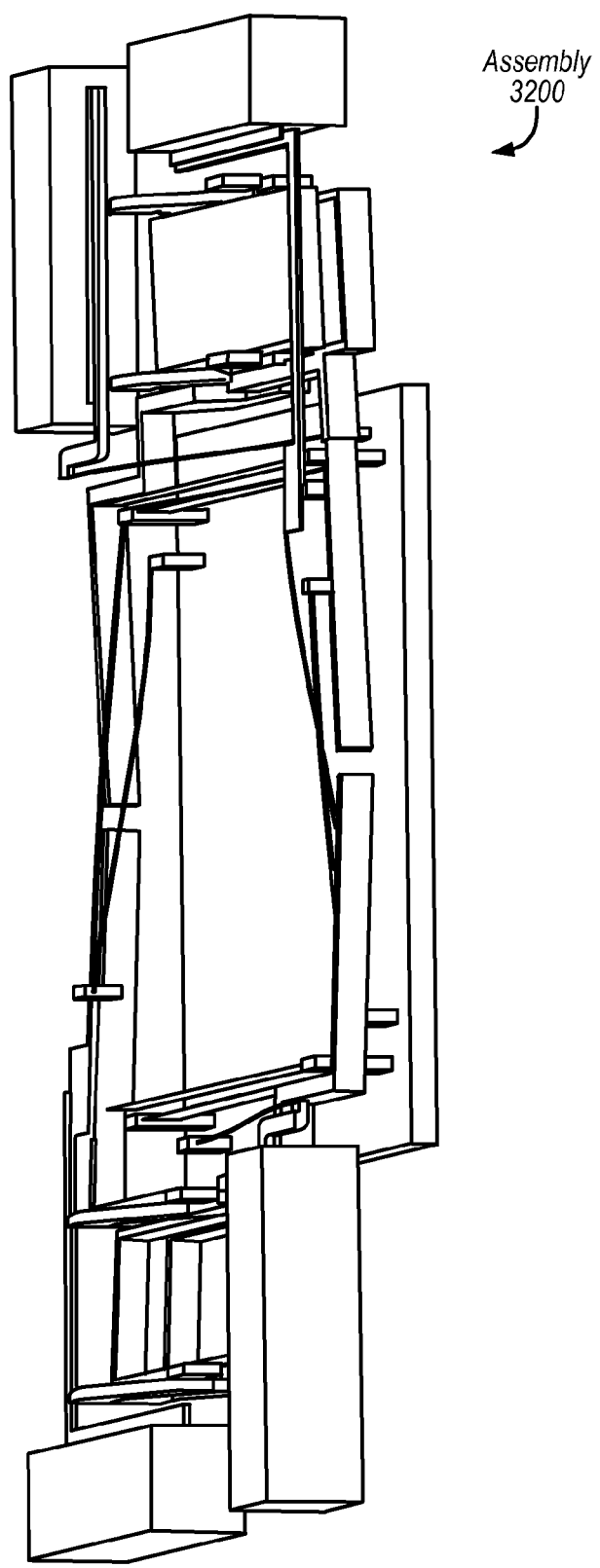
FIG. 32 depicts a resonant mode of an image sensor substrate linked to a MEMS actuator leaf-spring flexure for use with an image sensor according to some embodiments.

FIG. 32 depicts a resonant mode of an image sensor substrate linked to a MEMS actuator leaf-spring flexure for use with an image sensor according to some embodiments. Assembly 3200 is shown in a resonant mode at 68.4 Hz.

Figure 33:
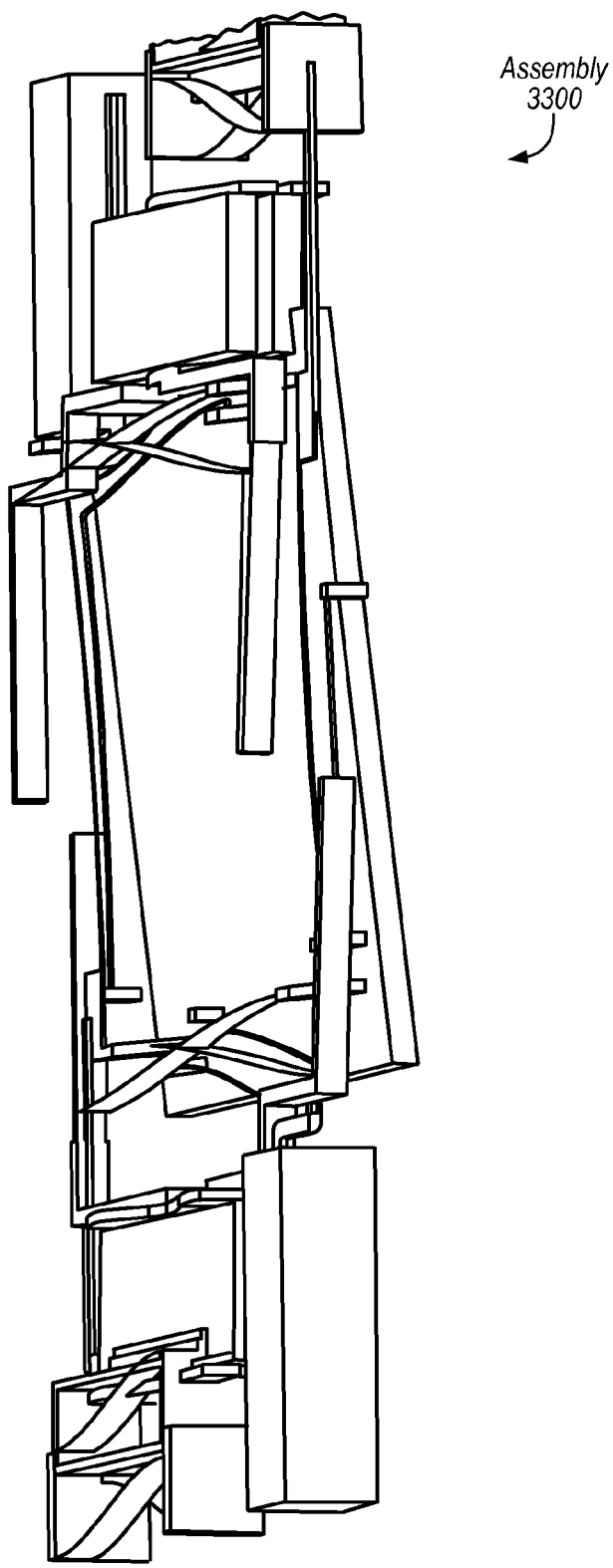
FIG. 33 illustrates a resonant mode of an image sensor substrate linked to a MEMS actuator leaf-spring flexure for use with an image sensor according to some embodiments.

FIG. 33 illustrates a resonant mode of an image sensor substrate linked to a MEMS actuator leaf-spring flexure for use with an image sensor according to some embodiments. Assembly 3300 is shown in a resonant mode at 69.5 Hz.

Figure 34:
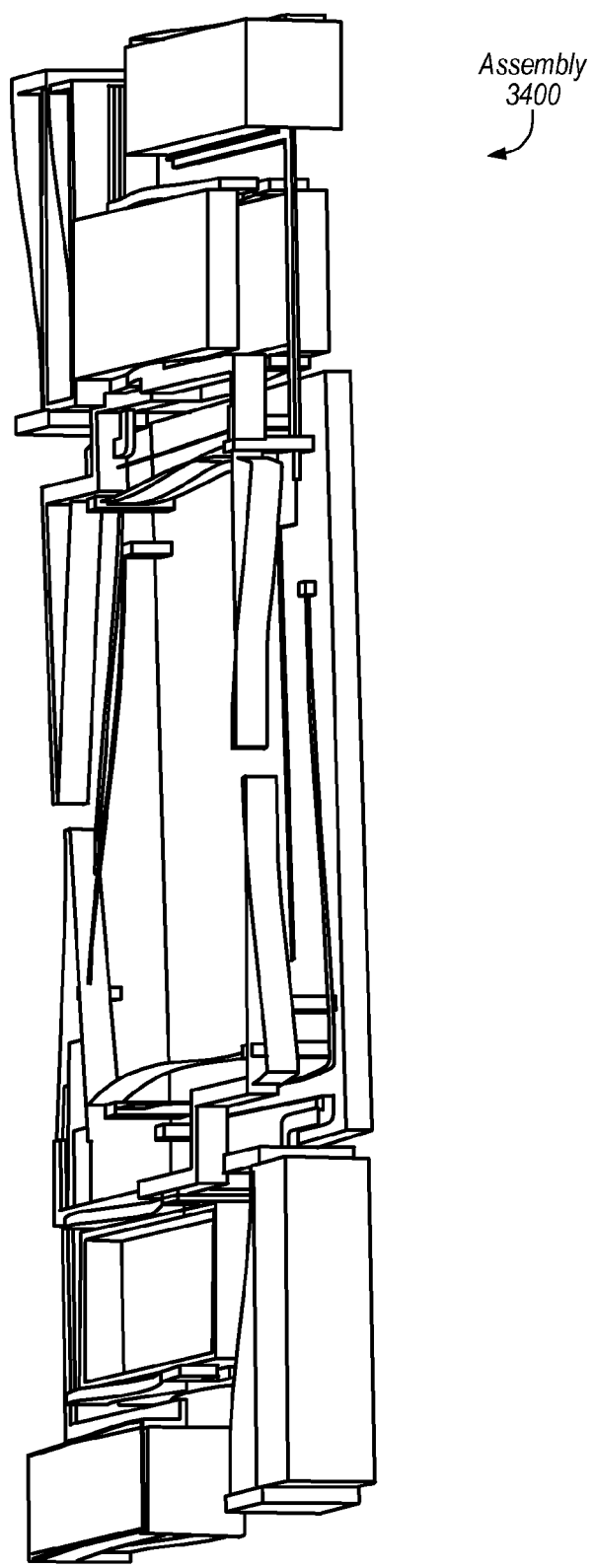
FIG. 34 depicts a resonant mode of an image sensor substrate linked to a MEMS actuator leaf-spring flexure for use with an image sensor according to some embodiments.

FIG. 34 depicts a resonant mode of an image sensor substrate linked to a MEMS actuator leaf-spring flexure for use with an image sensor according to some embodiments. Assembly 3400 is shown in a resonant mode at 73.0 Hz.

Figure 35:
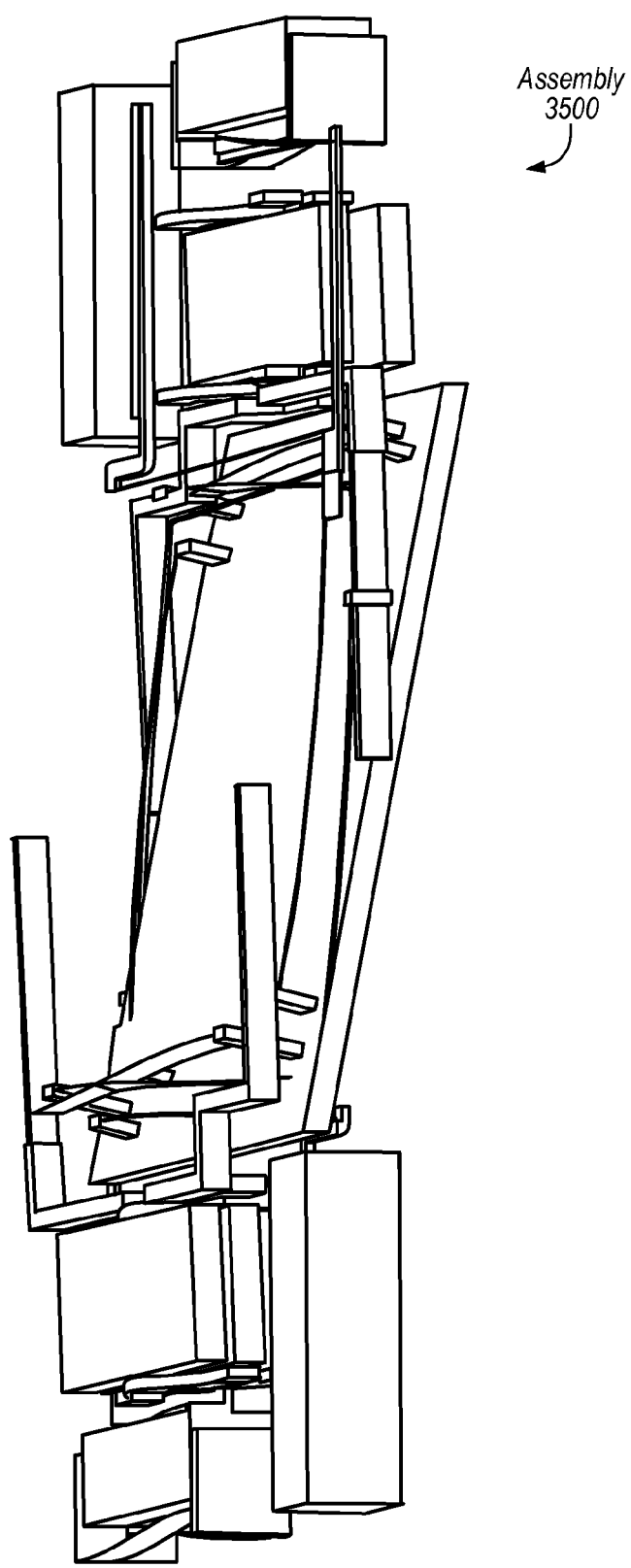
FIG. 35 illustrates a resonant mode of an image sensor substrate linked to a MEMS actuator leaf-spring flexure for use with an image sensor according to some embodiments.

FIG. 35 illustrates a resonant mode of an image sensor substrate linked to a MEMS actuator leaf-spring flexure for use with an image sensor according to some embodiments. Assembly 3500 is shown in a resonant mode at 87.5 Hz.

Figure 36:
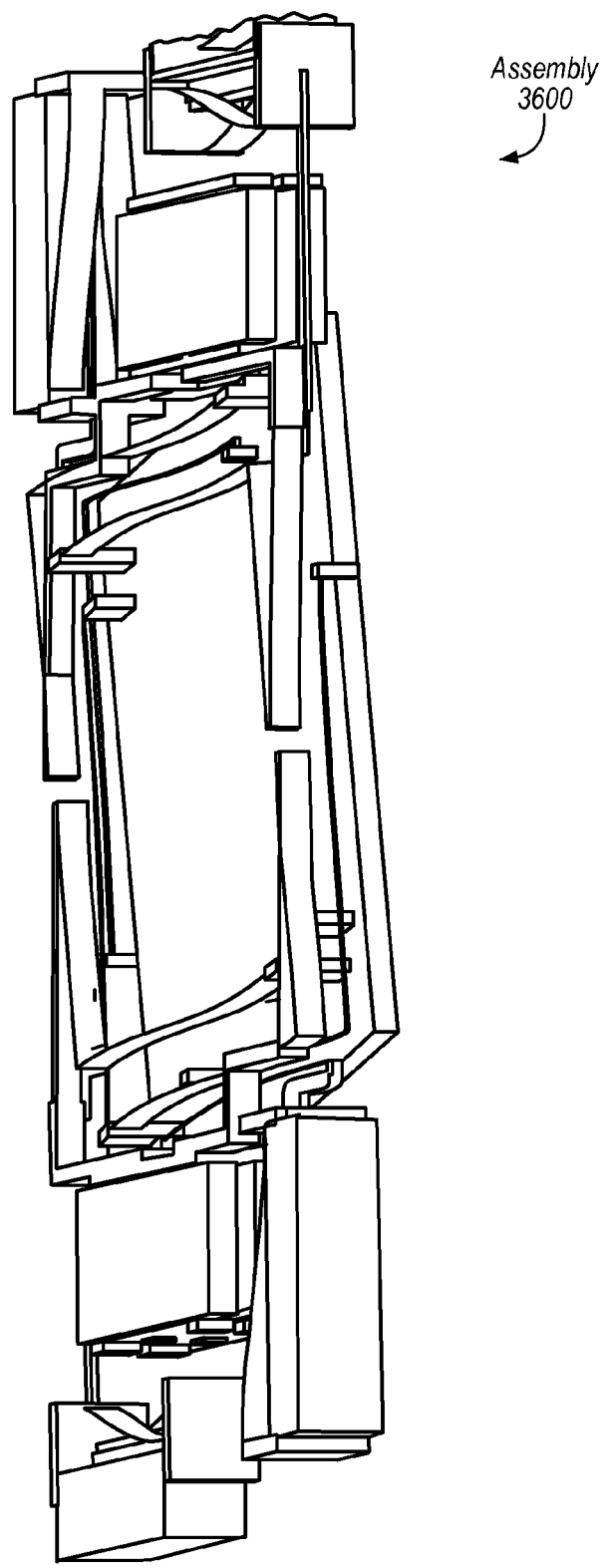
FIG. 36 depicts a resonant mode of an image sensor substrate linked to a MEMS actuator leaf-spring flexure for use with an image sensor according to some embodiments.

FIG. 36 depicts a resonant mode of an image sensor substrate linked to a MEMS actuator leaf-spring flexure for use with an image sensor according to some embodiments. Assembly 3600 is shown in a resonant mode at 97.2 Hz.

Figure 37:
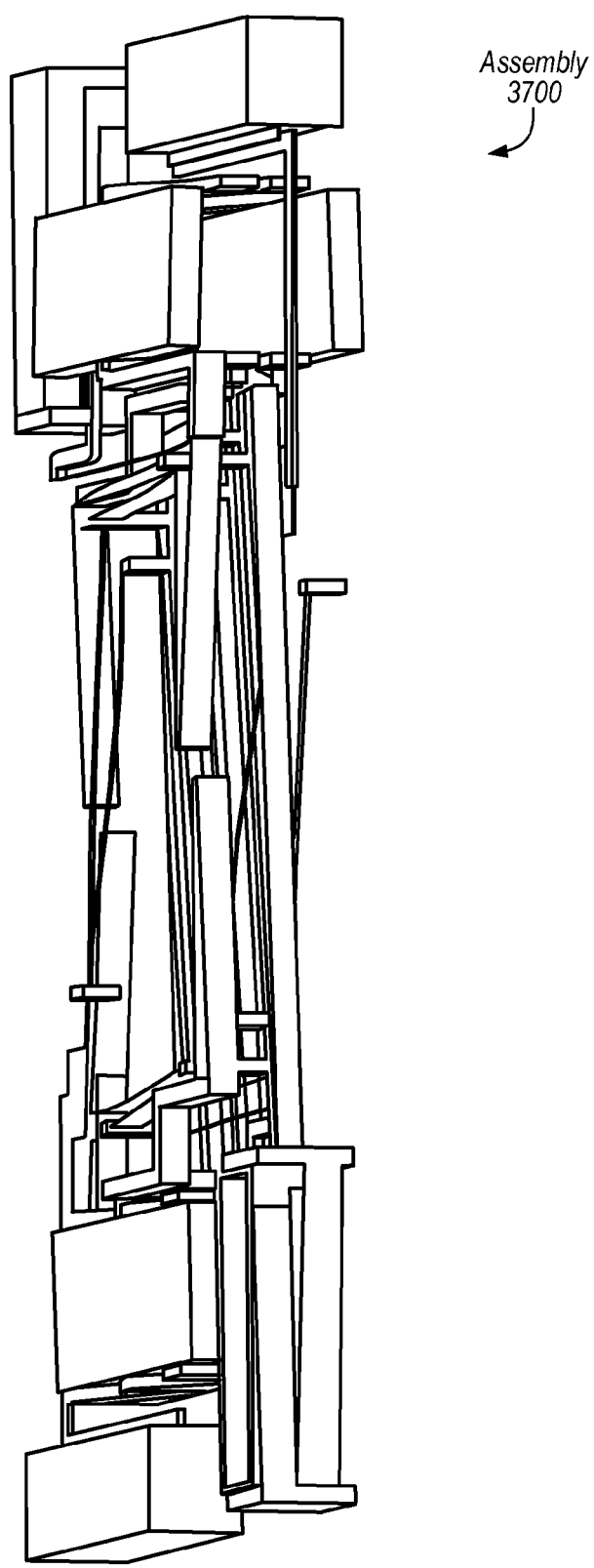
FIG. 37 illustrates a resonant mode of an image sensor substrate linked to a MEMS actuator leaf-spring flexure for use with an image sensor according to some embodiments.

FIG. 37 illustrates a resonant mode of an image sensor substrate linked to a MEMS actuator leaf-spring flexure for use with an image sensor according to some embodiments. Assembly 3700 is shown in a resonant mode at 100.4 Hz.

Example Computer System

Figure 38:
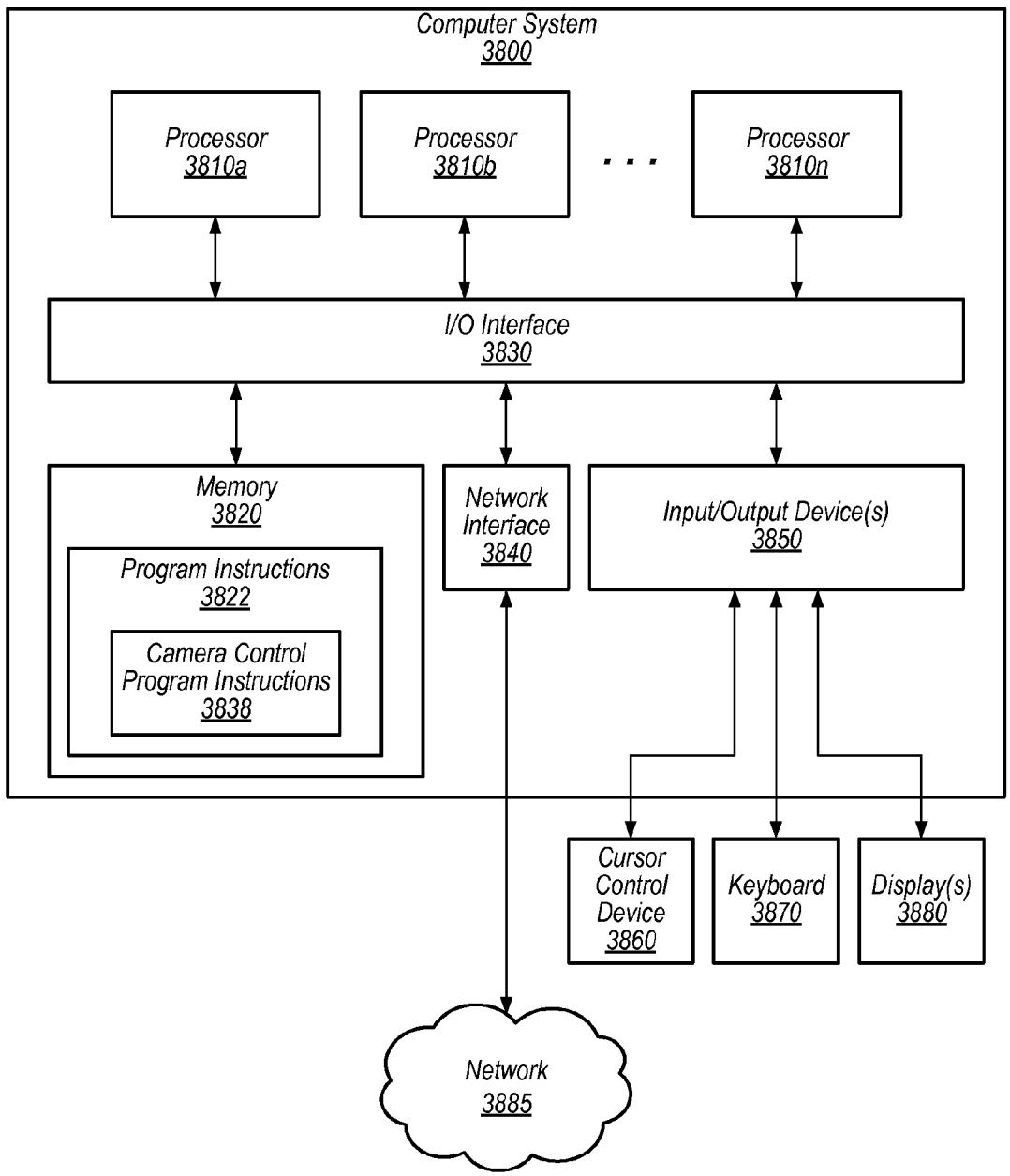
FIG. 38 illustrates an example computer system configured to implement aspects of the system and method for camera control, according to some embodiments.

FIG. 38 illustrates computer system 3800 that is configured to execute any or all of the embodiments described above. In different embodiments, computer system 3800 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 3800, which may interact with various other devices. Note that any component, action, or functionality described above with respect to FIGS. 1-20 may be implemented on one or more computers configured as computer system 3800 of FIG. 38, according to various embodiments. In the illustrated embodiment, computer system 3800 includes one or more processors 3810 coupled to a system memory 3820 via an input/output (I/O) interface 3830. Computer system 3800 further includes a network interface 3840 coupled to I/O interface 3830, and one or more input/output devices 3850, such as cursor control device 3860, keyboard 3870, and display(s) 3880. In some cases, it is contemplated that embodiments may be implemented using a single instance of computer system 3800, while in other embodiments multiple such systems, or multiple nodes making up computer system 3800, may be configured to host different portions or instances of embodiments. For example, in one embodiment some elements may be implemented via one or more nodes of computer system 3800 that are distinct from those nodes implementing other elements.

In various embodiments, computer system 3800 may be a uniprocessor system including one processor 3810, or a multiprocessor system including several processors 3810 (e.g., two, four, eight, or another suitable number). Processors 3810 may be any suitable processor capable of executing instructions. For example, in various embodiments processors 3810 may be general-purpose or embedded processors implementing any of a variety of instruction set architectures (ISAs), such as the x838, PowerPC, SPARC, or MIPS ISAs, or any other suitable ISA. In multiprocessor systems, each of processors 3810 may commonly, but not necessarily, implement the same ISA.

System memory 3820 may be configured to store camera control program instructions 3822 and/or camera control data accessible by processor 3810. In various embodiments, system memory 3820 may be implemented using any suitable memory technology, such as static random access memory (SRAM), synchronous dynamic RAM (SDRAM), nonvolatile/Flash-type memory, or any other type of memory. In the illustrated embodiment, program instructions 3822 may be configured to implement a lens control application 3824 incorporating any of the functionality described above. Additionally, existing camera control data 3832 of memory 3820 may include any of the information or data structures described above. In some embodiments, program instructions and/or data may be received, sent or stored upon different types of computer-accessible media or on similar media separate from system memory 3820 or computer system 3800. While computer system 3800 is described as implementing the functionality of functional blocks of previous Figures, any of the functionality described herein may be implemented via such a computer system.

In one embodiment, I/O interface 3830 may be configured to coordinate I/O traffic between processor 3810, system memory 3820, and any peripheral devices in the device, including network interface 3840 or other peripheral interfaces, such as input/output devices 3850. In some embodiments, I/O interface 3830 may perform any necessary protocol, timing or other data transformations to convert data signals from one component (e.g., system memory 3820) into a format suitable for use by another component (e.g., processor 3810). In some embodiments, I/O interface 3830 may include support for devices attached through various types of peripheral buses, such as a variant of the Peripheral Component Interconnect (PCI) bus standard or the Universal Serial Bus (USB) standard, for example. In some embodiments, the function of I/O interface 3830 may be split into two or more separate components, such as a north bridge and a south bridge, for example. Also, in some embodiments some or all of the functionality of I/O interface 3830, such as an interface to system memory 3820, may be incorporated directly into processor 3810.

Network interface 3840 may be configured to allow data to be exchanged between computer system 3800 and other devices attached to a network 3885 (e.g., carrier or agent devices) or between nodes of computer system 3800. Network 3885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3850 may, in some embodiments, include one or more display terminals, keyboards, keypads, touchpads, scanning devices, voice or optical recognition devices, or any other devices suitable for entering or accessing data by one or more computer systems 3800. Multiple input/output devices 3850 may be present in computer system 3800 or may be distributed on various nodes of computer system 3800. In some embodiments, similar input/output devices may be separate from computer system 3800 and may interact with one or more nodes of computer system 3800 through a wired or wireless connection, such as over network interface 3840.

As shown in FIG. 38, memory 3820 may include program instructions 3822, which may be processor-executable to implement any element or action described above. In one embodiment, the program instructions may implement the methods described above. In other embodiments, different elements and data may be included. Note that data may include any data or information described above.

Those skilled in the art will appreciate that computer system 3800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 3800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3800 may be transmitted to computer system 3800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A portable multifunction computing device, comprising:
   a camera, wherein the camera comprises:
      a base substrate comprising a first portion and a second portion;
      a lens rigidly coupled to the first portion of the base substrate;
      an image sensor rigidly coupled to the second portion of the base substrate; and
      a plurality of comb drive actuators rigidly affixed to the first portion of the base substrate, wherein
         the plurality of comb drive actuators is flexibly affixed to the second portion of the base substrate by a plurality of respective mechanical flexures,
         the respective mechanical flexures provide a flexible mechanical connection between the second portion and the first portion, and
         the plurality of comb drive actuators is arranged to control the motion of the second portion to adjust the position of the image sensor in multiple degrees of freedom relative to the lens.

2. The portable multifunction computing device of claim 1, further comprising:
   a plurality of electrically conductive flexures, separate from the plurality of respective mechanical flexures, wherein
      the electrically conductive flexures provide an electrical current conductive path between the image sensor and conductors mounted on the first portion.

3. The portable multifunction computing device of claim 1, wherein the comb drive actuators operate in parallel, rather than in series.

4. The portable multifunction computing device of claim 1, wherein
   each of the comb drive actuators generates bi-directional motion with a center of travel in a neutral position.

5. The portable multifunction computing device of claim 1, wherein
   the conductors mounted on the first portion comprise flip-chip bonding pads.

6. The portable multifunction computing device of claim 1, wherein the first portion comprises a ceramic substrate material.

7. The portable multifunction computing device of claim 1, wherein the second portion is a ceramic substrate material.

8. An actuator assembly for mounting a moving component, comprising:
   a base substrate comprising a first portion for mounting comb drive actuators and a second portion for mounting the moving component; and a plurality of comb drive actuators rigidly affixed to the first portion of the base substrate, wherein
the plurality of comb drive actuators is flexibly affixed to the second portion of the base substrate by a plurality of respective mechanical flexures,
the respective mechanical flexures provide a flexible mechanical connection between the second portion and the first portion, and
the plurality of comb drive actuators is arranged to control the motion of the second portion to adjust the position of the moving component in multiple degrees of freedom relative to a lens rigidly coupled to the first portion.

9. The actuator assembly for mounting a moving component of claim 8, further comprising:
a plurality of electrically conductive flexures, separate from the plurality of respective mechanical flexures, wherein
the electrically conductive flexures provide an electrical current conductive path between the moving component and conductors mounted on the first portion.

10. The actuator assembly for mounting a moving component of claim 8, wherein
the comb drive actuators operate in parallel, rather than in series.

11. The actuator assembly for mounting a moving component of claim 8, wherein
each of the comb drive actuators generates bi-directional motion with a center of travel in a neutral position.

12. The actuator assembly for mounting a moving component of claim 8, wherein
the conductors mounted on the first portion comprise flip-chip bonding pads.

13. The actuator assembly for mounting a moving component of claim 8, wherein
the first portion comprises a ceramic substrate material.

14. The actuator assembly for mounting a moving component of claim 8, wherein
the second portion is a ceramic substrate material.

15. A camera module for a portable multifunction device, comprising:
a base substrate comprising a first portion and a second portion;
a lens rigidly coupled to the first portion of the base substrate;
an image sensor rigidly coupled to the second portion of the base substrate; and
a plurality of comb drive actuators rigidly affixed to the first portion of the base substrate, wherein
the plurality of comb drive actuators is flexibly affixed to the second portion of the base substrate by a plurality of respective mechanical flexures,
the respective mechanical flexures provide a flexible mechanical connection between the second portion and the first portion, and
the plurality of comb drive actuators is arranged to control the motion of the second portion to adjust the position of the image sensor in multiple degrees of freedom relative to the lens of the camera module.

16. The camera module of claim 15, further comprising:
a plurality of electrically conductive flexures, separate from the plurality of respective mechanical flexures, wherein
the electrically conductive flexures provide an electrical current conductive path between the image sensor and conductors mounted on the first portion.

17. The camera module of claim 15, wherein
the comb drive actuators operate in parallel, rather than in series.

18. The camera module of claim 15, wherein
each of the comb drive actuators generates bi-directional motion with a center of travel in a neutral position.

19. The camera module of claim 15, wherein the conductors mounted on the first portion comprise flip-chip bonding pads.

20. The camera module of claim 15, wherein the first portion comprises a ceramic substrate material.

* * * * *